US012749401B2

(12) United States Patent
Inoue et al.

(10) Patent No.: US 12,749,401 B2
(45) Date of Patent: Sep. 29, 2026

(54) TRAFFIC SAFETY SUPPORT SYSTEM AND TRAFFIC SAFETY SUPPORT METHOD

(71) Applicant: HONDA MOTOR CO., LTD., Tokyo (JP)

(72) Inventors: Shigeru Inoue, Saitama (JP); Yuji Takagi, Saitama (JP); Yoshitaka Mimura, Saitama (JP); Akihito Kimata, Saitama (JP); Masaki Okumoto, Saitama (JP); Naotoshi Fujimoto, Saitama (JP); Hideo Kadowaki, Saitama (JP); Takahiro Kurehashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 18/712,259

(22) PCT Filed: Nov. 22, 2021

(86) PCT No.: PCT/JP2021/042785
§ 371 (c)(1),
(2) Date: May 22, 2024

(87) PCT Pub. No.: WO2023/089823
PCT Pub. Date: May 25, 2023

(65) Prior Publication Data

US 2024/0412637 A1 Dec. 12, 2024

(51) Int. Cl.
*G08G 1/16* (2006.01)

(52) U.S. Cl.
CPC ............. *G08G 1/166* (2013.01); *G08G 1/164* (2013.01)

(58) Field of Classification Search
CPC ............................... G08G 1/166; G08G 1/164
See application file for complete search history.

(56) References Cited

U.S. PATENT DOCUMENTS 9,842,496 B1 * 12/2017 Hayward ............... G07C 5/008
10,481,606 B1 * 11/2019 Wengreen .............. G05D 1/024
(Continued)

FOREIGN PATENT DOCUMENTS

JP 2006182207 A 7/2006
JP 2007155551 A 6/2007
(Continued)

*Primary Examiner* — Hussein Elchanti
(74) *Attorney, Agent, or Firm* — CKC & Partners Co., LLC

(57) ABSTRACT

This traffic safety support system comprises: a target traffic area recognition unit for acquiring recognition information concerning each of traffic participants; a driving subject information acquisition unit for acquiring driving subject state information correlated to the driving ability of a driving subject of a movement body recognized as a traffic participant; a prediction unit for predicting the future of a plurality of the traffic participants on the basis of the recognition information and the driving subject state information; and a cooperative support information notification unit for making notification of cooperative support information according to a prediction result. The prediction unit is characterized by: recognizing a motorcycle 3*a*, a four-wheeled vehicle 2*b*, and a pedestrian group 4*a* as first to third traffic participants, respectively; and predicting, on the basis of the recognition information and the driving subject state information, a future behavior of the motorcycle 3*a*, a future behavior of the four-wheeled vehicle 2*b* according to the future behavior of the motorcycle 3*a*, and a chain risk of the pedestrian group 4*a* in the future according to at least one of the future behaviors of the motorcycle 3*a* and the four-wheeled vehicle 2*b*.

10 Claims, 9 Drawing Sheets

(56) References Cited

U.S. PATENT DOCUMENTS

| | | | | |
|---|---|---|---|---|
| 2005/0267679 | A1* | 12/2005 | Tajima | G07B 15/063<br>701/410 |
| 2008/0027646 | A1* | 1/2008 | Kawabata | G01C 21/28<br>701/530 |
| 2014/0111647 | A1* | 4/2014 | Atsmon | G08G 1/14<br>348/148 |
| 2016/0059855 | A1 | 3/2016 | Rebhan et al. | |
| 2018/0242115 | A1* | 8/2018 | Kim | H04W 4/06 |
| 2019/0294176 | A1* | 9/2019 | Ozbilgin | G06V 20/56 |
| 2020/0180507 | A1* | 6/2020 | Katou | G08G 1/163 |
| 2023/0029533 | A1* | 2/2023 | Kim | B60W 50/14 |

FOREIGN PATENT DOCUMENTS

| | | | |
|---|---|---|---|
| JP | 2016051465 | A | 4/2016 |
| JP | 2018181036 | A | 11/2018 |
| JP | 2020042553 | A | 3/2020 |
| JP | 2021136001 | A | 9/2021 |

* cited by examiner

TRAFFIC SAFETY SUPPORT SYSTEM AND TRAFFIC SAFETY SUPPORT METHOD

TECHNICAL FIELD

The present invention relates to a traffic safety support system and a traffic safety support method. More specifically, the present invention relates to a traffic safety support system that supports safe movement of traffic participants as persons or moving bodies, and a traffic safety support method.

BACKGROUND ART

In public traffic, various traffic participants such as moving bodies including four-wheeled vehicles, motorcycles, bicycles, and the like, and pedestrians move at different speeds on the basis of individual intentions. As a technique for improving safety, convenience, and the like, of traffic participants in such public traffic, for example, Japanese Unexamined Patent Application Publication No. 2020-42553 discloses a moving body support system that predicts futures of the traffic participants, thereby supporting safe movement of moving bodies.

More specifically, the moving body support system disclosed in Japanese Unexamined Patent Application Publication No. 2020-42553 acquires participant information regarding traffic participants around a first moving body, predicts future states of the traffic participants on a basis of the acquired participant information, generates shared map information including the predicted future states of the traffic participants, sets a second moving body different from the first moving body as an object to be supported by measures for the traffic participants on the basis of the generated shared map information, and further provides information based on the prediction result to this object to be supported.

According to such a moving body support system, for example, in a case where the first moving body, the second moving body and a pedestrian are present at a common intersection and in a case where the pedestrian can be recognized from the first moving body but the pedestrian cannot be recognized from the second moving body, a prediction result about the future of the pedestrian based on the information acquired by the first moving body is provided to the second moving body set as the object to be supported, so that it is possible to avoid a risk that may occur between the second moving body and the pedestrian.

CITATION LIST

Patent Document

Patent Document 1: Japanese Unexamined Patent Application Publication No. 2020-42553

DISCLOSURE OF THE INVENTION

Problems to be Solved by the Invention

The moving body support system disclosed in Japanese Unexamined Patent Application Publication No. 2020-42553 is effective to avoid a risk that may occur between two participants, that is, in the above-described example, between two participants of the second moving body and the pedestrian that are principle parties. However, in the technique disclosed in Japanese Unexamined Patent Application Publication No. 2020-42553, a risk with which parties that are three or more traffic participants are involved and that occurs in a chained manner among these plurality of traffic participants is not sufficiently studied.

The present invention is directed to providing a traffic safety support system and a traffic safety support method capable of improving safety, convenience and smoothness of traffic by contributing to avoidance of a risk of three or more traffic participants that are parties.

Means for Solving the Problems (1) A traffic safety support system according to the present invention (for example, a traffic safety support system 1 described later) includes: a recognition means (for example, a target traffic area recognizer 60, an on-board driving support device 21, an on-board communication device 24, a portable information processing terminal 25, an on-board driving support device 31, an on-board communication device 34, a portable information processing terminal 35, a portable information processing terminal 40, a traffic light control device 55, an infrastructure camera 56, and a traffic environment database 64 described later) that recognizes traffic participants as persons (for example, a pedestrian 4 and a pedestrian group **4*a* described later) or moving bodies (for example, a four-wheeled vehicle 2, 2*a*, 2*b* and a motorcycle 3, 3*a* described later) in a target traffic area (for example, a target traffic area 9 described later) and acquires recognition information (for example, traffic participant recognition information and traffic environment recognition information described later) regarding each traffic participant; a driving subject information acquisition means (for example, a driving subject information acquirer 61, a driving subject state sensor 23, an on-board communication device 24, a portable information processing terminal 25, a rider state sensor 33, an on-board communication device 34, a portable information processing terminal 35, and a driving history database 65 described later) that acquires state information (for example, driving subject state information described later) correlated with driving capability of driving subjects of the moving bodies recognized as the traffic participants by the recognition means; a prediction means (for example, a predictor 62 described later) that predicts futures of a plurality of the traffic participants recognized by the recognition means on a basis of the recognition information and the state information; and a notification means (for example, a coordination support information notifier 63, a driver HMI 22, an on-board communication device 24, a portable information processing terminal 25, a rider HMI 32, an on-board communication device 34, a portable information processing terminal 35, and a portable information processing terminal 40** described later) that notifies at least one selected from a plurality of prediction targets by the prediction means of support information on the basis of a prediction result by the prediction means. According to the traffic safety support system, in a case where among first, second and third traffic participants that are the prediction targets, the first and second traffic participants are first and second moving bodies in the target traffic area and state information of at least one selected from the first and second moving bodies is acquired by the driving subject information acquisition means, the prediction means predicts a future behavior of the first moving body, a future behavior of the second moving body in accordance with the future behavior of the first moving body, and a risk in the future of the third traffic participant in accordance with the future behavior of at least one selected from the first and second moving bodies on the basis of the recognition information and the state information.

(2) In this case, in a case where occurrence of a risk in the future of the third traffic participant is predicted by the prediction means, the notification means preferably notifies a communication interface (for example, a portable information processing terminal of the pedestrian group 4*a* in Case 1 described later, and an on-board communication device of the second four-wheeled vehicle 2*b* in Case 2 described later) for the third traffic participant of the support information.

(3) In this case, in a case where the driving subject is a person, the driving subject information acquisition means preferably acquires the state information on the basis of time-series data of at least one selected from biological information, appearance information, and speech information of the driving subject engaged in driving.

(4) In this case, the driving subject information acquisition means, in a case where the driving subject is a person, preferably acquires characteristic information (for example, driving subject characteristic information described later) regarding characteristics of the driving subject on the basis of at least one selected from past driving history and the state information of the driving subject, and the prediction means preferably predicts futures of the prediction targets on the basis of the recognition information, the state information and the characteristic information.

(5) In this case, the recognition means preferably acquires the recognition information regarding recognition targets including each traffic participant in the target traffic area and a traffic environment of each traffic participant in the target traffic area.

(6) In this case, the prediction means preferably predicts futures of the prediction targets by constructing a virtual space that simulates the target traffic area using a computer and performing simulation based on the recognition information and the state information on the virtual space.

(7) In this case, the prediction means preferably includes a behavior estimation means (for example, a behavior estimator 623 described later) that associates a first input including at least the recognition information between the recognition information and the state information with at least one selected from a plurality of pattern behaviors of the driving subject determined in advance, and a simulator (for example, a simulator 626 described later) that predicts futures of the prediction targets by performing simulation based on the pattern behavior associated by the behavior estimation means on the virtual space.

(8) In this case, the behavior estimation means preferably includes a driving capability estimation means (for example, a driving capability estimator 624 described later) that estimates decrease of the driving capability for each capability element on the basis of the first input, and an association means (for example, an associator 625 described later) that associates the capability element estimated to decrease by the driving capability estimation means with at least one selected from a plurality of the pattern behaviors.

(9) In this case, the driving capability is preferably divided into at least four capability elements of cognitive capability, prediction capability, determination capability and operation capability by the driving subject.

(10) In this case, the prediction means preferably includes a high risk traffic participant identification means (for example, a high risk traffic participant identifier 621 described later) that identifies, as a high risk traffic participant, a traffic participant estimated to be highly likely to perform an action that induces a predetermined chain risk in the future among a plurality of traffic participants recognized by the recognition means on the basis of a second input including at least the recognition information between the recognition information and the state information, and a prediction target determination means (for example, a prediction target determiner 622 described later) that determines the high risk traffic participant as the first traffic participant, and determine, as the second and third traffic participants, two participants extracted from among a plurality of traffic participants existing around the first traffic participant.

(11) A traffic safety support method according to the present invention is a method of supporting safety of traffic participants using a computer (for example, a coordination support device 6 described later), the traffic safety support method including: a step (for example, a process of step ST1 in FIG. 4 will be described later) of recognizing traffic participants as persons (for example, a pedestrian 4 and a pedestrian group 4*a* described later) or moving bodies (for example, a four-wheeled vehicle 2, 2*a*, 2*b* and a motorcycle 3, 3*a* described later) in a target traffic area (for example, a target traffic area 9 described later) and acquiring recognition information (for example, traffic participant recognition information and traffic environment recognition information described later) regarding each traffic participant; a step (for example, a process of step ST2 in FIG. 4 described later) of acquiring state information (for example, driving subject state information described later) correlated with driving capability of driving subjects of the moving bodies recognized as the traffic participants; a step (for example, a process of step ST3 in FIG. 4 described later) of predicting futures of a plurality of prediction targets determined among a plurality of recognized traffic participants on a basis of the recognition information and the state information; and a step (for example, a process of step ST4 in FIG. 4 described later) of notifying at least one selected from a plurality of the prediction targets of support information (for example, coordination support information described later) on the basis of prediction results for the prediction targets. According to the traffic safety support method, in the step of predicting the futures of the prediction targets, in a case where among first, second and third traffic participants that are the prediction targets, the first and second traffic participants are first and second moving bodies in the target traffic area and state information of at least one selected from the first and second moving bodies is acquired, a future behavior of the first moving body, a future behavior of the second moving body in accordance with the future behavior of the first moving body, and a risk in the future of the third traffic participant in accordance with the future behavior of at least one selected from the first and second moving bodies are predicted on the basis of the recognition information and the state information.

Effects of the Invention (1) In the traffic safety support system according to the present invention, the prediction means predicts the futures of the plurality of traffic participants recognized by the recognition means on the basis of the recognition information regarding each traffic participant acquired by the recognition means and the state information correlated with driving capability of driving subjects of the moving bodies recognized as the traffic participants by the recognition means. Accordingly, the prediction means can predict the futures of the plurality of traffic participants including an irregular action of a specific moving body in view of decrease of the driving capability at that time of the driving subject of the specific moving body. The notification means notifies at least one selected from a plurality of prediction targets by the prediction means of the support information on the basis of the prediction results for these prediction targets, thereby making it possible to avoid a risk predicted for these prediction targets, so that it is possible to improve safety, convenience and smoothness of traffic.

In particular, in the present invention, in a case where among first, second and third traffic participants that are the prediction targets, the first and second traffic participants are first and second moving bodies in the target traffic area and state information of at least one selected from driving subjects of each of these first and second moving bodies is acquired, the prediction means predicts a future behavior of the first traffic participant, a future behavior of the second traffic participant in accordance with the future behavior of this first traffic participant, and a risk in the future of the third traffic participant in accordance with the future behavior of at least one selected from these first and second traffic participants on the basis of the recognition information and the state information. The notification means notifies at least one selected from these first and second moving bodies and the third traffic participant of the support information on the basis of the prediction results for the future behaviors of these first and second traffic participants and the prediction result for the risk in the future of the third traffic participant. This makes it possible to avoid a chain risk with which parties that are three or more participants including the first, second and third traffic participants are involved and that may occur in a chained manner among these plurality of traffic participants due to decrease of the driving capability of the driving subject of at least one selected from the first and second traffic participants and then occur in the third traffic participant. Thus, according to the present invention, it is possible to improve safety, convenience and smoothness of traffic.

(2) In a case where the third traffic participant is assumed as a subject, it is often difficult to predict a chain risk that can occur in a chained manner between the first and second traffic participants other than the third traffic participant itself and finally occur in the third traffic participant itself. Therefore, in many cases, the third traffic participant has little spare time to perform an action for avoiding such a risk that occurs in a chained manner. In contrast, in the traffic safety support system according to the present invention, in a case where occurrence of a chain risk in the future of the third traffic participant is predicted by the prediction means, the notification means notifies a communication interface possessed by the third traffic participant of the support information. This can secure a period for the third traffic participant to perform an action for avoiding a risk that occurs in a chained manner, so that it is possible to improve safety of the third traffic participant.

(3) In the traffic safety support system according to the present invention, in a case where the driving subject is a person, the driving subject information acquisition means acquires the state information on the basis of time-series data of at least one selected from biological information, appearance information, and speech information of the driving subject engaged in driving. The prediction means can predict a future behavior of a moving body driven by a driving subject by appropriately grasping the driving capability of the driving subject engaged in driving using such state information, so that it is possible to predict various risks that can occur in the prediction targets. Thus, according to the present invention, it is possible to improve safety, convenience and smoothness of traffic.

(4) In the traffic safety support system according to the present invention, in a case where the driving subject is a person, the driving subject information acquisition means acquires characteristic information regarding characteristics of a driving subject on the basis of at least one selected from past driving history of the driving subject and time-series state information of the driving subject. The prediction means can predict a future behavior of a moving body driven by a driving subject by appropriately grasping the characteristics in addition to the driving capability of the driving subject engaged in driving using the characteristic information of the driving subject in addition to the recognition information and the state information, so that it is possible to predict various risks that can occur in the prediction targets. Thus, according to the present invention, it is possible to improve safety, convenience and smoothness of traffic.

(5) In the traffic safety support system according to the present invention, the recognition means acquires the recognition information regarding the recognition targets including each traffic participant in a target traffic area and an traffic environment of each traffic participant in this target traffic area. The prediction means can predict futures of the prediction targets by appropriately grasping the traffic environment around each traffic participant using such recognition information, so that it is possible to predict various risks that can occur in the prediction targets. Thus, according to the present invention, it is possible to improve safety, convenience and smoothness of traffic.

(6) In the traffic safety support system according to the present invention, the prediction means predicts futures of the prediction targets by constructing a virtual space that simulates the target traffic area using a computer and performing simulation based on the recognition information and the state information on the virtual space. By this means, the prediction means can predict various risks that can occur in the prediction targets by reproducing each traffic participant in the target traffic area and the traffic environment around each traffic participant and monitoring an event that can occur in the target traffic area from a higher perspective. Thus, according to the present invention, it is possible to improve safety, convenience and smoothness of traffic.

(7) In the traffic safety support system according to the present invention, the behavior estimation means associates the first input including at least the recognition information between the recognition information and the state information with at least one selected from a plurality of pattern behaviors of the driving subject determined in advance, and the simulator predicts futures of the prediction targets by performing simulation based on the pattern behavior associated by the behavior estimation means on the virtual space. In the present invention, the prediction means can predict futures of the prediction targets promptly by behaviors that can be performed by the driving subject of the moving body in the future being determined in advance as the pattern behaviors, so that it is possible to promptly make notifications of support information based on the prediction result by the prediction means, which results in securing a period for each traffic participant to perform an action for avoiding a risk that can occur in the future. Thus, according to the present invention, it is possible to improve safety, convenience and smoothness of traffic.

(8) In the traffic safety support system according to the present invention, the behavior estimation means includes a driving capability estimation means that estimates decrease of the driving capability of the driving subject for each capability element on the basis of the first input including at least the recognition information, and an association means that associates the capability element estimated to decrease by the driving capability estimation means with at least one selected from a plurality of the pattern behaviors determined in advance. This allows the association means to promptly determine the pattern behavior from the first input, so that it is possible to further secure a period for each traffic participant to perform an action for avoiding a risk that can occur in the future as described above. Thus, according to the present invention, it is possible to improve safety, convenience and smoothness of traffic.

(9) In the traffic safety support system according to the present invention, the driving capability estimation means divides driving capability that the driving subject should have to appropriately drive the moving body into at least four capability elements of cognitive capability, prediction capability, determination capability and operation capability, and estimates decrease of the driving capability of the driving subject for each of the four capability elements. This allows the behavior estimation means to promptly determine an appropriate pattern behavior in accordance with decrease of each capability element, so that it is possible to further secure a period for each traffic participant to perform an action for avoiding a risk that can occur in the future as described above. Thus, according to the present invention, it is possible to improve safety, convenience and smoothness of traffic.

(10) Although three or more traffic participants exist actually in the target traffic area, when a risk that can occur in a chained manner, as described above, in prediction targets that are all of these traffic participants is evaluated, load required for the prediction means may increase. In contrast, in the traffic safety support system according to the present invention, the high risk traffic participant identification means identifies, as a high risk traffic participant, a traffic participant estimated to be highly likely to perform an action that induces a predetermined chain risk in the future among a plurality of traffic participants recognized by the recognition means, and a prediction target determination means determines, with the first traffic participant specified as this high risk traffic participant, two participants extracted from among a plurality of traffic participants existing around this first traffic participant as the second and third traffic participants. In this way, the prediction means can reduce load in the prediction means by narrowing down the prediction targets to the high risk traffic participant and the traffic participants around the high risk traffic participant, so that it is possible to promptly predict the futures of the prediction targets, which results in securing a period for each traffic participant to perform an action for avoiding a risk that can occur in the future. Thus, according to the present invention, it is possible to improve safety, convenience and smoothness of traffic.

(11) According to the traffic safety support method according to the present invention, it is possible to improve safety, convenience and smoothness of traffic for the same reason as the invention according to (1).

PREFERRED MODE FOR CARRYING OUT THE INVENTION

A traffic safety support system and a traffic safety support method according to one embodiment of the present invention will be described below with reference to the drawings.

Figure 1:
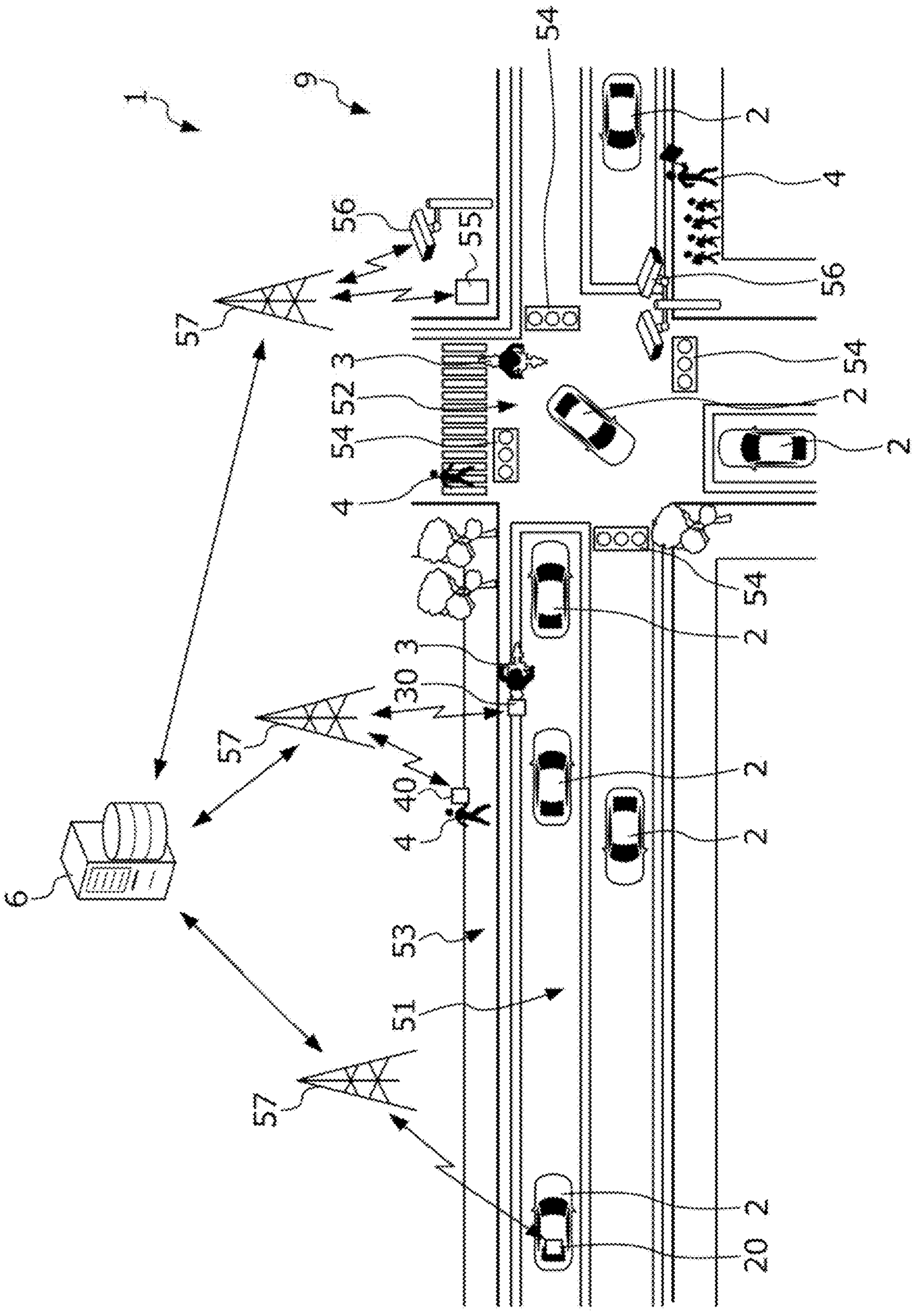
FIG. 1 is a view illustrating a configuration of a traffic safety support system according to one embodiment of the present invention and part of a target traffic area to be supported by the traffic safety support system.

FIG. 1 is a view schematically illustrating a configuration of a traffic safety support system 1 according to the present embodiment and part of a target traffic area 9 to be supported by the traffic safety support system 1 are present.

The traffic safety support system 1 supports safe and smooth traffic of traffic participants in the target traffic area 9 by recognizing pedestrians 4 that are persons moving in the target traffic area 9 and four-wheeled vehicles 2, motorcycles 3, and the like, that are mobile bodies as individual traffic participants, notifying each traffic participant of support information generated through the recognition to encourage communication (specifically, for example, reciprocal recognition between the traffic participants) between the traffic participants that move on the basis of intentions of the traffic participants and recognition of a surrounding traffic environment.

FIG. 1 illustrates a case where an area around an intersection 52 in an urban area, including a road 51, the intersection 52, a pavement 53 and traffic lights 54 as traffic infrastructure equipment is set as the target traffic area 9. FIG. 1 illustrates a case where a total of seven four-wheeled vehicles 2 and a total of two motorcycles 3 move on the road 51 and at the intersection 52 and a total of three sets of pedestrians 4 move on the pavement 53 and at the intersection 52. Further, FIG. 1 illustrates a case where a total of three infrastructure cameras 56 are provided. Note that while a case will be described below where in all of the four-wheeled vehicles 2 moving in the target traffic area 9, drivers that are persons are set as driving subjects, the present invention is not limited to this. The present invention can be applicable even in the case where all or some of a plurality of four-wheeled vehicles 2 moving in the target traffic area 9 are automated driving vehicles each in which a non-human computer is set as a driving subject.

The traffic safety support system 1 includes on-board devices 20 (including on-board devices mounted on the four-wheeled vehicles 2 and portable information processing terminals possessed or worn by drivers who drive the four-wheeled vehicles 2) that moves along with individual four-wheeled vehicles 2, on-board devices 30 (including on-board devices mounted on the motorcycles 3 and portable information processing terminals possessed or worn by drivers who drive the motorcycles 3) that move along with individual motorcycles 3, portable information processing terminals 40 possessed or worn by the respective pedestrians 4, a plurality of the infrastructure cameras 56 provided in the target traffic area 9, a traffic light control device 55 that controls the traffic lights 54, and a coordination support device 6 connected to a plurality of terminals (hereinafter, also simply referred to as "area terminals") such as these on-board devices 20 and 30, the portable information processing terminals 40, the infrastructure cameras 56 and the traffic light control device 55 installed in the target traffic area 9 so as to be able to perform communication.

The coordination support device 6 includes one or more computers connected to the above-described plurality of area terminals via a base station 57 so as to be able to perform communication. More specifically, the coordination support device 6 includes a server connected to the plurality of area terminals via the base station 57, a network core and the Internet, an edge server connected to the plurality of area terminals via the base station 57 and an MEC (multi-access edge computing) core, and the like.

Figure 2:
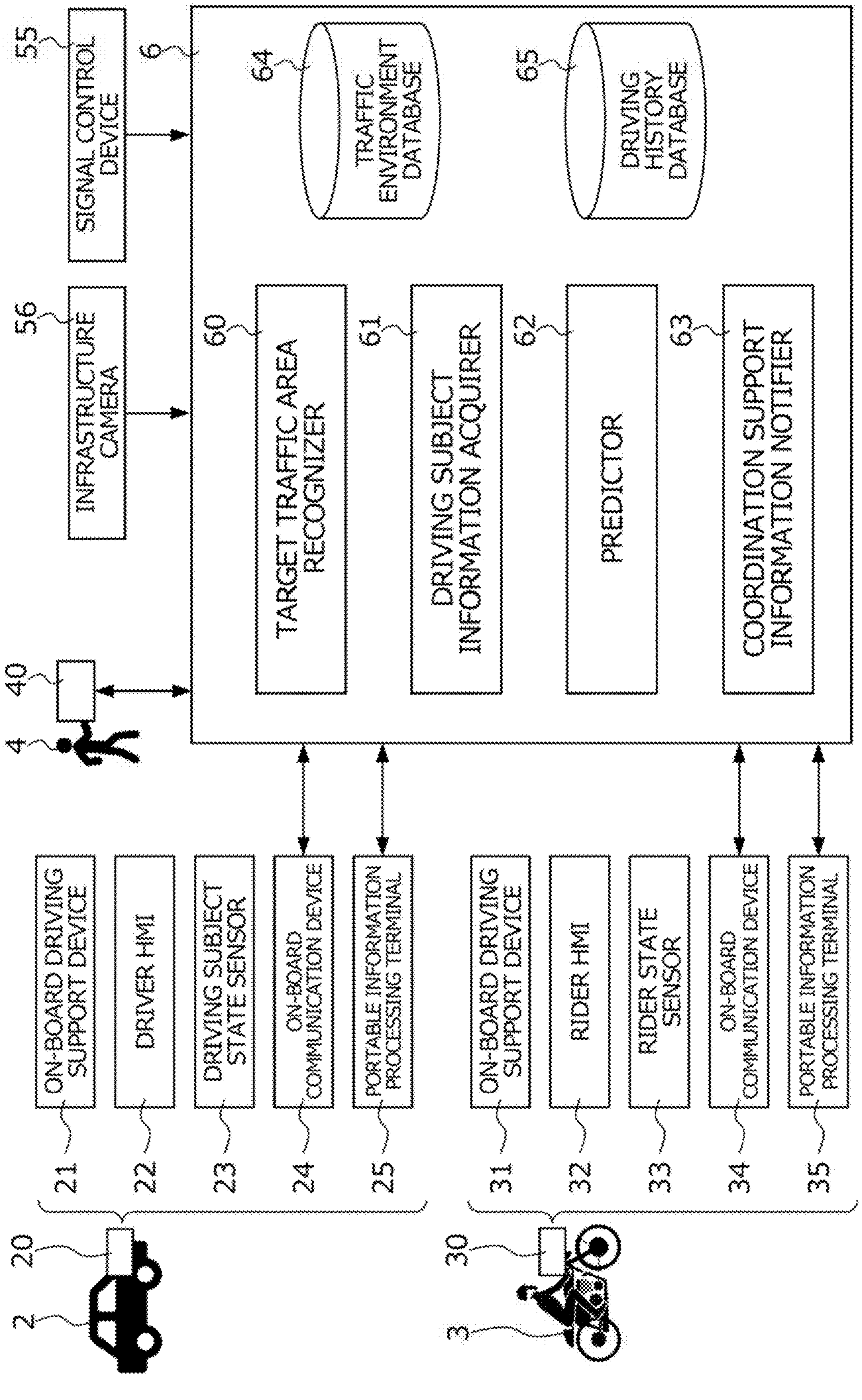
FIG. 2 is a block diagram illustrating a configuration of a coordination support device and a plurality of area terminals connected to the coordination support device so as to be able to perform communication.

FIG. 2 is a block diagram illustrating a configuration of the coordination support device 6 and a plurality of area terminals connected to the coordination support device 6 so as to be able to perform communication.

The on-board devices 20 mounted on each four-wheeled vehicle 2 in the target traffic area 9 include, for example, an on-board driving support device 21 that supports driving by a driver, a driver human machine interface (HMI) 22 that notifies the driver of driving support information transmitted from the on-board driving support device 21 and coordination support information, which will be described later, transmitted from the coordination support device 6, a driving subject state sensor 23 that detects a state of the driver engaged in driving, an on-board communication device 24 that performs wireless communication between the own vehicle and the coordination support device 6, a portable information processing terminal 25 possessed or worn by the driver, and the like.

The on-board driving support device 21 includes an external sensor, an own vehicle state sensor, a navigation device, a driving support ECU, and the like. The external sensor includes an exterior camera that captures an image around the own vehicle, a radar unit and a LIDAR (light detection and ranging) unit that detects a target outside the vehicle using an electromagnetic wave, and an outside recognition device that acquires information regarding a state around the own vehicle by performing sensor fusion processing on detection results from these exterior camera and radar unit, etc. The own vehicle state sensor includes a sensor that acquires information regarding a traveling state of the own vehicle, such as a vehicle speed sensor, an acceleration sensor, a steering angle sensor, a yaw rate sensor, a position sensor and an orientation sensor. The navigation device includes, for example, a GNSS receiver that specifies a current position of the own vehicle on the basis of a signal received from a GNSS (global navigation satellite system) satellite, a storage device that stores map information, and the like.

The driving support ECU executes driving support control such as lane keeping control, lane departure prevention control, lane change control, preceding vehicle following control, collision mitigation brake control, and erroneous start prevention control on the basis of the information acquired by the external sensor, the own vehicle state sensor, the navigation device, and the like. Further, the driving support ECU generates driving support information for supporting safe driving by the driver on the basis of the information acquired by the external sensor, the own vehicle state sensor, the navigation device, and the like, and transmits the driving support information to the driver HMI 22.

The driving subject state sensor 23 includes various devices that acquire time-series data of information correlated with driving capability of the driver engaged in driving. The driving subject state sensor 23 includes, for example, an on-board camera that detects a direction of a line of sight of the driver engaged in driving, whether or not the driver opens his/her eyes, and the like, a seat belt sensor that is provided at a seat belt to be fastened by the driver and detects a pulse of the driver, whether or not the driver breathes, and the like, a steering sensor that is provided at a steering to be gripped by the driver and detects a skin potential of the driver, and an on-board microphone that detects whether or not there is conversation between the driver and passengers.

The on-board communication device 24 has a function of transmitting the information acquired by the driving support ECU (including the information acquired by the external sensor, the own vehicle state sensor, the navigation device, and the like, control information regarding driving support control that is being executed, and the like), the information regarding the driving subject acquired by the driving subject state sensor 23, and the like, to the coordination support device 6, and a function of receiving coordination support information transmitted from the coordination support device 6 and transmitting the received coordination support information to the driver HMI 22.

The driver HMI 22 includes various devices that notify the driver of the driving support information transmitted from the on-board driving support device 21 and the coordination support information transmitted from the coordination support device 6 through visual sense, auditory sense, haptic sense, and the like of the driver. The driver HMI 22 includes, for example, a seat belt control device that notifies the driver of the driving support information and the coordination support information by changing tension of the seat belt to be fastened by the driver, an acoustic device that notifies the driver of the driving support information and the coordination support information by emitting speech, warning sound, melody, and the like, a head-up display that notifies the driver of the driving support information and the coordination support information by displaying an image, and the like.

The wearable terminal has a function of measuring biological information of the driver such as a heart rate, a blood pressure and a blood oxygen level and transmitting the measurement data of the biological information to the coordination support device 6 and a function of receiving the coordination support information transmitted from the coordination support device 6 and notifying the driver of a message in accordance with the coordination support information with an image, speech, warning sound, vibration, and the like. Further, the smartphone has a function of transmitting information regarding the driver such as position information, travel acceleration and schedule information of the driver to the coordination support device 6 and a function of receiving the coordination support information transmitted from the coordination support device 6 and notifying the driver of a message in accordance with the coordination support information with an image, speech, warning sound, melody, vibration, and the like.

The on-board devices 30 mounted on each motorcycle 3 in the target traffic area 9 include, for example, an on-board driving support device 31 that supports driving by a rider, a rider HMI 32 that notifies the rider of driving support information transmitted from the on-board driving support device 31 and coordination support information transmitted from the coordination support device 6, a rider state sensor 33 that detects a state of the rider engaged in driving, a portable information processing terminal 35 possessed or worn by the rider, and the like.

The on-board driving support device 31 includes an external sensor, an own vehicle state sensor, a navigation device, a driving support ECU, and the like. The external sensor includes an exterior camera that captures an image around the own vehicle, a radar unit and a LIDAR unit that detects a target outside the vehicle by using an electromagnetic wave, and an outside recognition device that acquires information regarding a state around the own vehicle by performing fusion processing on detection results from these exterior camera and radar unit, etc. The own vehicle state sensor includes sensors that acquire information regarding a traveling state of the own vehicle such as a vehicle speed sensor and a five-axis or six-axis inertial measurement device. The navigation device includes, for example, a GNSS receiver that specifies a current position on the basis of a signal received from a GNSS satellite, a storage device that stores map information, and the like.

The driving support ECU executes driving support control such as lane keeping control, lane departure prevention control, lane change control, preceding vehicle following control and collision mitigation brake control on the basis of the information acquired by the external sensor, the own vehicle state sensor, the navigation device, and the like. Further, the driving support ECU generates driving support information for supporting safe driving by the rider on the basis of the information acquired by the external sensor, the own vehicle state sensor, the navigation device, and the like, and transmits the driving support information to the rider HMI 32.

The rider state sensor 33 includes various devices that acquire information correlated with driving capability of the rider engaged in driving. The rider state sensor 33 includes, for example, a seat sensor that is provided at a seat to be seated by the rider and detects a pulse, whether or not the rider breathes, and the like, a helmet sensor that is provided at a helmet to be worn by the rider and detects a pulse of the rider, whether or not the rider breathes, a skin potential, and the like.

The on-board communication device 34 has a function of transmitting the information acquired by the driving support ECU (including the information acquired by the external sensor, the own vehicle state sensor, the navigation device, and the like, and control information regarding driving support control that is being executed), information regarding the rider acquired by the rider state sensor 33, and the like, to the coordination support device 6 and a function of receiving the coordination support information transmitted from the coordination support device 6 and transmitting the received coordination support information to the rider HMI 32.

The rider HMI 32 includes various devices that notify the rider of the driving support information transmitted from the on-board driving support device 21 and the coordination support information transmitted from the coordination support device 6 through visual sense, auditory sense, haptic sense, and the like of the driver. The rider HMI 32 includes, for example, an acoustic device that is provided at a helmet to be worn by the rider and notifies the driver of the driving support information and the coordination support information by emitting speech, warning sound, melody, and the like, a head-up display that notifies the driver of the driving support information and the coordination support information by displaying an image, and the like.

The portable information processing terminal 40 possessed or worn by the pedestrian 4 in the target traffic area 9 includes, for example, a wearable terminal to be worn by the pedestrian 4, a smartphone possessed by the pedestrian 4, and the like. The wearable terminal has a function of measuring biological information of the pedestrian 4 such as a heart rate, a blood pressure and a blood oxygen level and transmitting the measurement data of the biological information to the coordination support device 6 and a function of receiving the coordination support information transmitted from the coordination support device 6 and notifying the pedestrian 4 of a message in accordance with the coordination support information with an image, speech, warning sound, vibration, and the like. Further, the smartphone has a function of transmitting pedestrian information regarding the pedestrian 4 such as position information, travel acceleration and schedule information of the pedestrian 4 to the coordination support device 6 and a function of receiving the coordination support information transmitted from the coordination support device 6 and notifying the pedestrian 4 of a message in accordance with the coordination support information with an image, speech, warning sound, melody, vibration, and the like.

The infrastructure camera 56 captures images of traffic infrastructure equipment including a road, an intersection and a pavement in a target traffic area and mobile bodies and pedestrians that move on the road, the intersection, the pavement, and the like, and transmits the obtained image information to the coordination support device 6.

The traffic light control device 55 controls the traffic lights and transmits traffic light state information regarding current lighting color of the traffic lights provided in the target traffic area, a timing at which the lighting color is switched, and the like, to the coordination support device 6.

The coordination support device 6 is a computer that supports safe and smooth traffic of the traffic participants in the target traffic area by generating coordination support information for encouraging communication between the traffic participants and recognition of a surrounding traffic environment on the basis of the information acquired from a plurality of area terminals present in the target traffic area as described above and notifying each traffic participant.

The coordination support device 6 includes a target traffic area recognizer 60 that recognizes persons and moving bodies in the target traffic area as individual traffic participants, a driving subject information acquirer 61 that acquires driving subject state information correlated with driving capabilities of driving subjects of the moving bodies recognized as the traffic participants by the target traffic area recognizer 60, a predictor 62 that predicts futures of prediction targets determined among a plurality of traffic participants recognized by the target traffic area recognizer 60, a coordination support information notifier 63 that notifies at least one selected from the prediction targets on a basis of a prediction result by the predictor 62 of the coordination support information according to the prediction result, a traffic environment database 64 in which information regarding a traffic environment of the target traffic area is accumulated, and a driving history database 65 in which information regarding past driving history by the driving subjects registered in advance is accumulated.

In the traffic environment database 64, information regarding traffic environments of the traffic participants in the target traffic area such as map information of the target traffic area registered in advance (for example, a width of the road, the number of lanes, speed limit, a width of the pavement, whether or not there is a guardrail between the road and the pavement, a position of a crosswalk) and risk area information regarding particularly high risk areas within the target traffic area, is stored. In the following description, the information stored in the traffic environment database 64 will be also referred to as registered traffic environment information.

In the driving history database 65, information regarding past driving history of the driving subjects registered in advance is stored in association with registration numbers of mobile bodies possessed by the driving subjects. Thus, if the registration numbers of the recognized mobile bodies can be specified by the target traffic area recognizer 60 which will be described later, the past driving history of the driving subjects of the recognized mobile bodies can be acquired by searching the driving history database 65 on the basis of the registration numbers. In the following description, the information stored in the driving history database 65 will also be referred to as registered driving history information.

The target traffic area recognizer 60 recognizes traffic participants that are persons or mobile bodies in the target traffic area and recognition targets including traffic environments of the respective traffic participants in the target traffic area on the basis of the information transmitted from the above-described area terminal (the on-board devices 20 and 30, the portable information processing terminal 40, the infrastructure camera 56 and the traffic light control device 55) in the target traffic area and the registered traffic environment information read from the traffic environment database 64 and acquires recognition information regarding the recognition targets.

Here, the information transmitted from the on-board driving support device 21 and the on-board communication device 24 included in the on-board devices 20 to the target traffic area recognizer 60 and the information transmitted from the on-board driving support device 31 and the on-board communication device 34 included in the on-board devices 30 to the target traffic area recognizer 60 include information regarding traffic participants present near the own vehicle and a state regarding the traffic environment acquired by the external sensor, information regarding a state of the own vehicle as one traffic participant acquired by the own vehicle state sensor, the navigation device and the like, and the like. Further, the information transmitted from the portable information processing terminal 40 to the target traffic area recognizer 60 includes information regarding a state of a pedestrian as one traffic participant, such as a position and travel acceleration. Still further, the image information transmitted from the infrastructure camera 56 to the target traffic area recognizer 60 includes information regarding the respective traffic participants and traffic environments of the traffic participants, such as appearance of the traffic infrastructure equipment such as the road, the intersection and the pavement, and appearance of traffic participants moving in the target traffic area. Further, the traffic light state information transmitted from the traffic light control device 55 to the target traffic area recognizer 60 includes information regarding traffic environments of the respective traffic participants such as current lighting color of the traffic lights and a timing for switching the lighting color. Further, the registered traffic environment information to be read by the target traffic area recognizer 60 from the traffic environment database 64 includes information regarding traffic environments of the respective traffic participants such as map information, the risk area information, and the like, of the target traffic area.

Thus, the target traffic area recognizer 60 can acquire recognition information of each traffic participant (hereinafter, also referred to as "traffic participant recognition information") such as a position of each traffic participant in the target traffic area, moving speed, moving acceleration, direction of movement, a vehicle type of the mobile body, a vehicle rank, registration number of the mobile body, the number of people of the pedestrian and an age group of the pedestrian on the basis of the information transmitted from the area terminals. Further, the target traffic area recognizer 60 can acquire recognition information of the traffic environment (hereinafter, also referred to as "traffic environment recognition information") of each traffic participant in the target traffic area such as a width of the road, the number of lanes, speed limit, a width of the pavement, whether or not there is a guardrail between the road and the pavement, lighting color of the traffic light, a switching timing of the lighting color, and the risk area information on the basis of the information transmitted from the area terminals.

Thus, in the present embodiment, the recognizer that recognizes, as the recognition targets, the target traffic area and the traffic participants in this target traffic area, and acquire the traffic participant recognition information and the traffic environment recognition information regarding these recognition targets includes the target traffic area recognizer 60, the on-board driving support device 21, the on-board communication device 24 and the portable information processing terminal 25 included in the on-board devices 20 of the four-wheeled vehicle 2, the on-board driving support device 31, the on-board communication device 34 and the portable information processing terminal 35 included in the on-board devices 30 of the motorcycle 3, the portable information processing terminal 40 of the pedestrian 4, the infrastructure camera 56, the traffic light control device 55 and the traffic environment database 64.

The target traffic area recognizer 60 transmits the traffic participant recognition information and the traffic environment recognition information acquired as described above to the driving subject information acquirer 61, the predictor 62, the coordination support information notifier 63, and the like.

The driving subject information acquirer 61 acquires driving subject state information and driving subject characteristic information correlated with current driving capabilities of the driving subjects of the mobile bodies recognized as the traffic participants by the target traffic area recognizer 60 on the basis of the information transmitted from the above-described area terminals (particularly, the on-board devices 20 and 30) in the target traffic area and the registered driving history information read from the driving history database 65.

More specifically, in a case where the driving subject of the four-wheeled vehicle recognized as the traffic participant by the target traffic area recognizer 60 is a person, the driving subject information acquirer 61 acquires the information transmitted from the on-board devices 20 mounted on the four-wheeled vehicle as driving subject state information of the driver. Further, in a case where the driving subject of the motorcycle recognized as the traffic participant by the target traffic area recognizer 60 is a person, the driving subject information acquirer 61 acquires the information transmitted from the on-board devices 30 mounted on the motorcycle as driving subject state information of the rider.

Here, the information to be transmitted from the driving subject state sensor 23 and the on-board communication device 24 included in the on-board devices 20 to the driving subject information acquirer 61 includes time-series data regarding appearance information such as a direction of a line of sight of the driver engaged in driving and whether or not the driver opens his/her eyes, biological information such as a pulse, whether or not the driver breathes, and a skin potential, speech information such as whether or not there is conversation, and the like, which is correlated with driving capability of the driver who is driving. Further, the information to be transmitted from the rider state sensor 33 and the on-board communication device 34 included in the on-board devices 30 to the driving subject information acquirer 61 includes time-series data regarding biological information such as a pulse of the rider, whether or not the rider breathes and a skin potential, which is correlated with driving capability of the rider engaged in driving. Further, the information to be transmitted from the portable information processing terminals 25 and 35 included in the on-board devices 20 and 30 to the driving subject information acquirer 61 includes personal schedule information of the driver and the rider. In a case where the driver and the rider drive the mobile bodies, for example, under tight schedule, there is a case where the driver and the rider may feel pressed, and driving capabilities may degrade. Thus, it can be said that the personal schedule information of the driver and the rider is information correlated with the driving capabilities of the driver and the rider.

Thus, in the present embodiment, the driving subject information acquirer that acquires the driving subject state information correlated with current driving capability of the driving subject includes the driving subject information acquirer 61, the driving subject state sensor 23, the on-board communication device 24 and the portable information processing terminal 25 included in the on-board devices 20 of the four-wheeled vehicle 2, and the rider state sensor 33, the on-board communication device 34 and the portable information processing terminal 25 included in the on-board devices 30 of the motorcycle 3.

The driving subject information acquirer 61 acquires driving subject characteristic information regarding characteristics (such as, for example, too many times of sudden lane change and too many times of sudden acceleration and deceleration) regarding driving of the driving subject correlated with current driving capability of the driving body engaged in driving by using both or one of the driving subject state information for the driving subject acquired through the following procedure and the registered driving history information read from the driving history database 65.

Thus, in the present embodiment, the driving subject information acquirer that acquires the driving subject information correlated with current driving capability of the driving subject includes the driving subject information acquirer 61, the driving subject state sensor 23, the on-board communication device 24 and the portable information processing terminal 25 included in the on-board devices 20 of the four-wheeled vehicle 2, the rider state sensor 33, the on-board communication device 34, and the portable information processing terminal 35 included in the on-board devices 30 of the motorcycle 3, and the driving history database 65.

The driving subject information acquirer 61 transmits the driving subject state information and the driving subject characteristic information of the driving subject acquired as described above to the predictor 62.

The predictor 62 predicts futures of a plurality of prediction targets determined among the plurality of traffic participants recognized by the target traffic area recognizer 60 on the basis of the traffic participant recognition information and the traffic environment recognition information acquired by the target traffic area recognizer 60 and the driving subject state information and the driving subject characteristic information acquired by the driving subject information acquirer 61. More specifically, the predictor 62 predicts futures of a plurality of prediction targets by constructing a virtual space that simulates the target traffic area on the basis of the traffic participant recognition information and the traffic environment recognition information acquired by the target traffic area recognizer 60 and performing simulation on the virtual space on the basis of the traffic participant recognition information, the traffic environment recognition information, the driving subject state information and the driving subject characteristic information. Note that in the predictor 62, the procedure for determining the plurality of prediction targets and the procedure for predicting futures of these prediction targets will be described in detail later with reference to FIG. 3.

The coordination support information notifier 63 notifies at least one selected from the plurality of prediction targets by the predictor 62 of the coordination support information for encouraging communication between the prediction targets and recognition of a surrounding traffic environment on the basis of the prediction result by the predictor 62. More specifically, in a case where the predictor 62 predicts that some kind of risk is predicted to occur between the plurality of prediction targets, the coordination support information notifier 63 identifies, as notification targets, the plurality of traffic participants as parties that can be involved with the predicted risk, generates the coordination support information including content in accordance with each notification target and the prediction result, and notifies one or more notification targets that can perform wireless communication among the plurality of notification targets of the coordination support information.

In a case where the identified notification target is a pedestrian recognized as the traffic participant by the target traffic area recognizer 60, the coordination support information notifier 63 notifies the portable information processing terminal 40 possessed or worn by this pedestrian of the coordination support information. Upon receiving the coordination support information, the portable information processing terminal 40 as described above notifies the pedestrian that is an owner of the portable information processing terminal 40 of this coordination support information.

In a case where the identified notification target is a moving body recognized as the traffic participant by the target traffic area recognizer 60, the coordination support information notifier 63 notifies the on-board devices 20, 30 mounted on the moving body of the coordination support information. The on-board communication device 24 included in the on-board devices 20 as described above transmits the coordination support information to the driver HMI 22 upon receiving it, and the driver HMI 22 notifies the driver of the received coordination support information. Upon receiving the coordination support information, the portable information processing terminal 25 included in the on-board devices 20 notifies the driver that is an owner of the portable information processing terminal 25 of this coordination support information. The on-board communication device 34 included in the on-board devices 30 as described above transmits the coordination support information to the rider HMI 32 upon receiving it, and the rider HMI 32 notifies the rider of the received coordination support information. Upon receiving the coordination support information, the portable information processing terminal 35 included in the on-board devices 30 notifies the rider that is an owner of the portable information processing terminal 35 of this coordination support information.

Thus, in the present embodiment, the notifier that notifies at least one selected from the plurality of prediction targets of the coordination support information on the basis of the prediction result by the predictor 62 includes the coordination support information notifier 63, the on-board communication device 24, the driver HMI 22 and the portable information processing terminal 25 included in the on-board devices 20, and the on-board communication device 34, the rider HMI 32 and the portable information processing terminal 35 included in the on-board devices 30, and the portable information processing terminal 40 possessed by the pedestrian.

Figure 3:
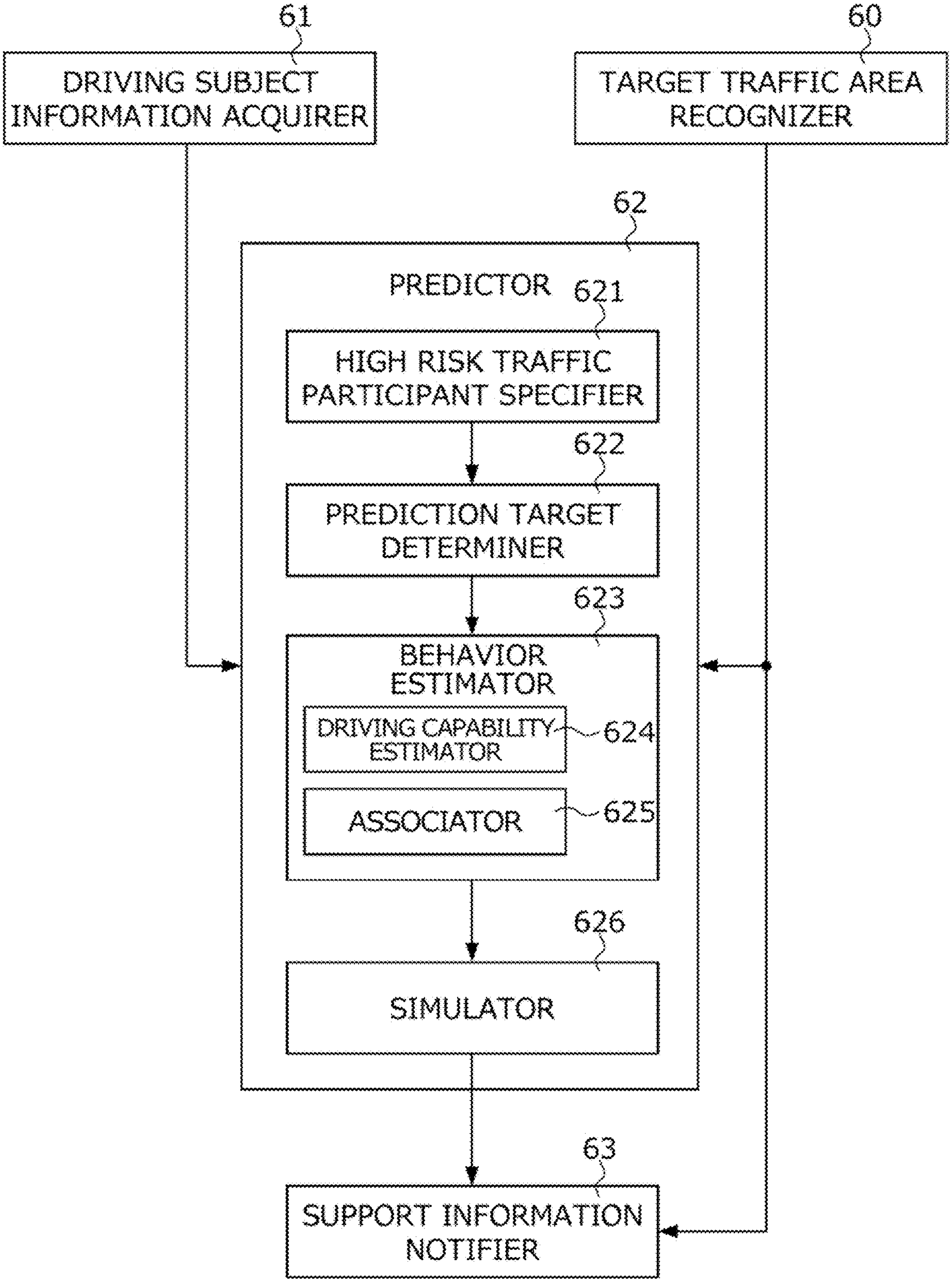
FIG. 3 is a functional block diagram illustrating a specific configuration of a predictor.

FIG. 3 is a functional block diagram illustrating a specific configuration of the predictor 62. Note that FIG. 3 illustrates only a function for the prediction of a risk among risk prediction functions for each traffic participant by the predictor 62, the risk being, in particular, a risk (hereinafter, referred to as a "chain risk") with which parties that are three or more participants among a plurality of traffic participants recognized by the target traffic area recognizer 60 are involved and that occurs in a chained manner.

The predictor 62 includes a high risk traffic participant identifier 621, a prediction target determiner 622, a behavior estimator 623, and a simulator 626, and predicts a chain risk for a plurality of prediction targets by using these.

The high risk traffic participant identifier 621 identifies, as a high risk traffic participant, a traffic participant estimated to be highly likely to perform an action that induces a predetermined chain risk in the future among all of the traffic participants recognized by the target traffic area recognizer 60 on the basis of the traffic participant recognition information and the traffic environment recognition information (hereinafter, also collectively referred to as "recognition information") acquired by the target traffic area recognizer 60.

Here, the action that induces a chain risk refers to an action that is highly likely to induce the chain risk as described above. Specifically, examples of such an action that induces a chain risk include sudden acceleration, sudden deceleration, sudden lane change, interruption, action of closing a distance to a preceding vehicle or subsequent vehicle, action of continuously traveling across lanes, swerving, wrong-way driving, ignoring a traffic light, action of traveling at higher speed than surrounding moving bodies by equal to or greater than predetermined speed, action of traveling at lower speed than surrounding moving bodies by equal to or greater than predetermined speed, action of traveling at higher speed than speed limit by equal to or greater than predetermined speed, action of traveling at lower speed than speed limit by equal to or greater than predetermined speed, and action of inhibiting movement of surrounding traffic participants.

Here, a plurality of actions that induce a chain risk listed above are often performed due to decrease of the driving capability of the driving subject of the moving body. Therefore, the high risk traffic participant identifier 621 preferably identifies a high risk traffic participant on the basis of at least one selected from the driving subject state information and the driving subject characteristic information (hereinafter, also collectively referred to as "driving subject information") acquired by the driving subject information acquirer 61 in addition to the above-described recognition information. The high risk traffic participant identifier 621 may identify a high risk traffic participant by estimating a behavior of a driving subject of a moving body using the behavior estimator 623 which will be described later, for example.

The prediction target determiner 622 extracts N traffic participants (where N is an arbitrary integer equal to or greater than 3) that can be parties involved with the chain risk among the plurality of traffic participants recognized by the target traffic area recognizer 60 and determines the extracted first traffic participant, second traffic participant, third traffic participant, . . . N-th traffic participant as prediction targets.

More specifically, the prediction target determiner 622 determines, as the first traffic participant, a traffic participant identified as the high risk traffic participant by the high risk traffic participant identifier 621 among the plurality of traffic participants recognized by the target traffic area recognizer 60. The prediction target determiner 622 extracts a plurality of traffic participants existing around the first traffic participants on the basis of the recognition information, extracts (N-1) participants that can be parties involved with the chain risk induced by the first traffic participant performing an action that induces the chain risk in the future from among the plurality of extracted traffic participants, and determines these (N-1) participants as the second traffic participant, the third traffic participants, . . . , N-th traffic participant.

The behavior estimator 623 identifies moving bodies among the first to N-th traffic participants determined as the prediction targets by the prediction target determiner 622 on the basis of the recognition information and estimates a behavior that can be performed in future by the driving subject of each moving body recognized as the traffic participant. The behavior estimator 623, in which behaviors that can be performed in the future by the driving subjects are determined in advance as a plurality of pattern behaviors, estimates a behavior that can be performed by the driving subject of each moving body in the future by associating a behavior estimation input including at least the recognition information between the recognition information and the driving subject information with at least one selected from the plurality of pattern behaviors determined in advance.

Here, the pattern behaviors that can be performed by the driving subject include, for example, unintentional behaviors of the driving subject such as delay in forward perception, delay in backward perception and delay in lateral perception, in addition to intentional behaviors of the driving subject such as acceleration operation, deceleration operation, steering operation, lane keeping operation, surrounding confirmation action, and lane change operation.

The behavior estimator 623 includes a driving capability estimator 624 that estimates decrease of driving capability of the driving subject for each of capability elements determined in advance in view of a surrounding traffic environment including other traffic participants on the basis of the above-described behavior estimation input, and an associator 625 that associates a capability element estimated to decrease by the driving capability estimator 624 with at least one selected from the above-described plurality of pattern behaviors in view of the traffic environment, and determines a behavior that can be performed in the future by the driving subject of each moving body from the plurality of pattern behaviors by using the driving capability estimator 624 and the associator 625.

Here, the driving capability estimator 624 divides driving capability that the driving subject should have to appropriately drive the moving body into at least four capability elements of cognitive capability, prediction capability, determination capability and operation capability. The cognitive capability is capability of the driving subject to appropriately recognize states of an own vehicle, a traffic environment around the own vehicle and traffic participants. The prediction capability is capability of the driving subject to appropriately predict change of the own vehicle, the traffic environment around the own vehicle and the traffic participants. The determination capability is capability of the driving subject to appropriately perform determination in accordance with states of the own vehicle, the surrounding traffic environment and the traffic participants. Further, the operation capability is capability of the driving subject to appropriately operate the own vehicle. The behaviors that can be performed by the driving subject differ in accordance with the decreasing capability element. Thus, the behavior estimator 623 can narrow down the number of pattern behaviors to be associated with the behavior estimation input by estimating decrease of the driving capability of the driving subject for each of the above-described capability elements on the basis of the behavior estimation input as described above.

The behavior estimator 623 estimates a future behavior of the driving subject of each moving body recognized as the traffic participant by the target traffic area recognizer 60 among the plurality of prediction targets through the procedure described above.

The simulator 626 predicts a future behavior of each of the first to N-th traffic participants determined as prediction targets and a chain risk that can occur in the future of each of the first to N-th traffic participants by constructing a virtual space that simulates the target traffic area on the basis of the recognition information and performing simulation based on the recognition information and the driving subject information on the virtual space. More specifically, the simulator 626 predicts a behavior of each of the first to N-th traffic participants determined as the prediction targets from the present to the future that is a predetermined prediction period from the present time and a chain risk of each traffic participant from the present to the future that is the prediction period from the present time by performing simulation based on the recognition information for the first to N-th traffic participants and the pattern behavior that is associated by the behavior estimator 623 for each driving subject of each moving body, on the virtual space constructed on the basis of the recognition information.

Here, it is conceivable that the first traffic participant recognized as the high risk traffic participant performs an action that induces a high risk, which serves as a trigger to cause the above-described chain risk to occur in a chained manner while providing mutual influence of the first to N-th traffic participants. Then, the simulator 626 predicts a behavior and a risk of the first traffic participant from the present to the future, a behavior and a risk of the second traffic participant from the present to the future in accordance with the behavior of this first traffic participant, a behavior and a risk of the third traffic participant from the present to the future in accordance with at least one behavior of these first and second traffic participants, and a behavior and a risk of the (n+1)th traffic participant from the present to the future in accordance with the behaviors of the first to n-th traffic participants (where n is an arbitrary integer between 2 and N-1) by performing simulation on the virtual space in view of an influence of the behavior of each traffic participant on the behaviors of the other traffic participants on the basis of the recognition information for each traffic participant and the pattern behavior associated for each driving subject of each moving body.

As described above, in a case where any one of a plurality of traffic participants recognized by the target traffic area recognizer 60 is identified as the high risk traffic participant by the high risk traffic participant identifier 621, the predictor 62 predicts the futures of the plurality of prediction targets including this high risk traffic participant by performing simulation by the simulator 626. Note that in a case where a plurality of high risk traffic participants are identified by the high risk traffic participant identifier 621, the predictor 62 predicts the futures of these prediction targets by performing simulation for the prediction target determined for each high risk traffic participant. The predictor 62 transmits the information regarding these prediction results to the coordination support information notifier 63 after the behaviors and risk with respect to the plurality of prediction targets are predicted by the above-described procedure.

In a case where a chain risk with which parties that are three or more targets among the plurality of prediction targets are involved is predicted to occur by the predictor 62, the coordination support information notifier 63 acquires the information regarding these plurality of parties and the information regarding content of the chain risk predicted to occur from the target traffic area recognizer 60 and the predictor 62, generates the coordination support information for each party on the basis of the acquired information, and notifies the generated coordination support information to each party. At this time, the coordination support information notifier 63 preferably generates appropriate coordination support information for each of the plurality of parties so as to avoid occurrence of the predicted chain risk by encouraging communication between the plurality of predicted parties and recognition of a surrounding traffic environment to perform the appropriate action for each of the parties.

Figure 4:
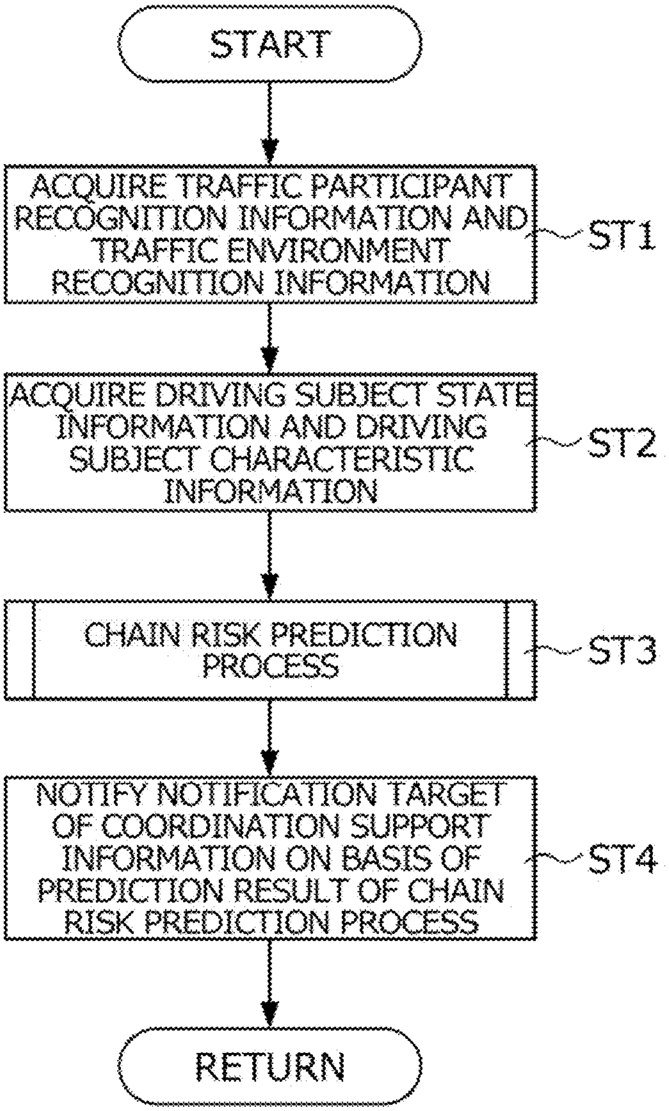
FIG. 4 is a flowchart illustrating a specific procedure of a traffic safety support method.

FIG. 4 is a flowchart illustrating a specific procedure of traffic safety support processing method of supporting safe and smooth traffic of each traffic participants in the target traffic area using the traffic safety support system as described above.

First, in step ST1, the target traffic area recognizer 60 recognizes recognition targets including a plurality of traffic participants and traffic environments of the traffic participants in the target traffic area 9 on the basis of the information transmitted from a plurality of area terminals in the target traffic area 9 and the registered traffic environment information read from the traffic environment database 64, and acquires the traffic participant recognition information regarding these plurality of traffic participants and the traffic environment recognition information regarding the traffic environment, and the process proceeds to step ST2.

Next, in step ST2, the driving subject information acquirer 61 acquires driving subject state information and driving subject characteristic information correlated with current driving capabilities of the driving subjects of the moving bodies recognized as the traffic participants by the target traffic area recognizer 60 on the basis of the information transmitted from the plurality of area terminals in the target traffic area 9 and the registered driving history information read from the driving history database 65, and the process proceeds to step ST3.

Next, in step ST3, the predictor 62 executes a chain risk prediction process according to the procedure illustrated with reference to FIG. 5 which will be described later to determine a plurality of prediction targets among the plurality of traffic participants recognized by the target traffic area recognizer 60 and to predict future behaviors of these plurality of prediction targets and a chain risk in the futures of these plurality of prediction targets on the basis of the traffic participant recognition information, the traffic environment recognition information, the driving subject state information and the driving subject characteristic information, and the process proceeds to step ST4.

Next, in step ST4, the coordination support information notifier 63 notifies one or more notification targets determined among the plurality of prediction targets of the coordination support information on the basis of the prediction result for the plurality of prediction targets by the chain risk prediction process in step ST3, and the process returns to step ST1. More specifically, in a case where a chain risk is predicted to occur in the plurality of prediction targets by executing the chain risk prediction process, the coordination support information notifier 63 identifies, as the notification targets, a plurality of traffic participants as parties that can be involved with this chain risk, and notifies at least one selected from these parties, more preferably all the parties of the coordination support information.

Figure 5:
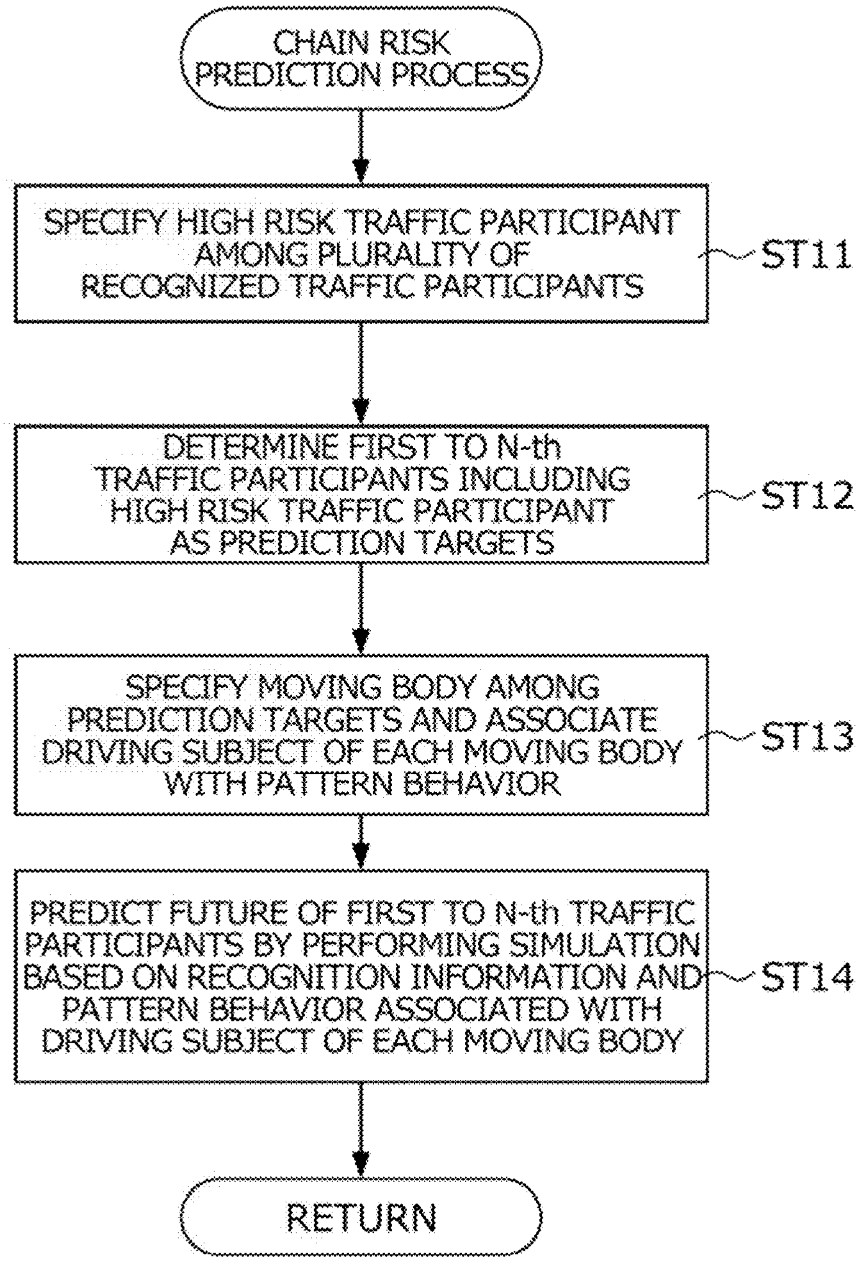
FIG. 5 is a flowchart illustrating a specific procedure of a chain risk prediction process by a predictor.

FIG. 5 is a flowchart illustrating a specific procedure of the chain risk prediction process by the predictor 62.

First, in step ST11, the high risk traffic participant identifier 621 identifies, as a high risk traffic participant, a traffic participant estimated to be highly likely to perform an action that induces a predetermined chain risk in the future among all of the traffic participants recognized by the target traffic area recognizer 60 on the basis of the traffic participant recognition information, the traffic environment recognition information, the driving subject state information, and the driving subject characteristic information, and the process proceeds to step ST12.

Next, in step ST12, the prediction target determiner 622 determines, as the prediction targets, the first to N-th traffic participants that can be parties involved with the chain risk induced by the high risk traffic participant identified in step ST11 performing an action that induces the chain risk in the future, among the plurality of traffic participants recognized by the target traffic area recognizer 60, and the process proceeds to step ST13. More specifically, the prediction target determiner 622 extracts, with the first traffic participant identified as the high risk traffic participant, (N-1) participants that can be parties involved with the chain risk from among the plurality of extracted traffic participants existing around this first traffic participant, and determines these (N-1) participants as the second traffic participant, the third traffic participants, . . . , N-th traffic participant.

Next, in step ST13, the behavior estimator 623 identifies moving bodies among the prediction targets, and estimates the behavior that can be performed in the future by the driving subject of each moving body recognized as these traffic participants, and the process proceeds to step ST14. More specifically, the driving capability estimator 624 of the behavior estimator 623 estimates decrease of driving capability of each driving subject for each of capability elements on the basis of the traffic participant recognition information, the traffic environment recognition information, the driving subject state information, and the driving subject characteristic information, and further, the associator 625 of the behavior estimator 623 associates a capability element estimated to decrease by the driving capability estimator 624 with at least one selected from the plurality of pattern behaviors determined in advance in view of the traffic environment, and associates the driving subject of each moving body with the pattern behavior.

Next, in step ST14, the simulator 626 predicts a future behavior of each of the first to N-th traffic participants determined as prediction targets and a chain risk in the future of each of the first to N-th traffic participants by constructing a virtual space that simulates the target traffic area on the basis of the traffic participant recognition information and the traffic environment recognition information and performing simulation based on the recognition information and the driving subject information on the virtual space, and the process returns to step ST4 in FIG. 4. More specifically, the simulator 626 predicts a future behavior and a risk of the first traffic participant, a future behavior and a risk of the second traffic participant in accordance with the behavior of this first traffic participant, a future behavior and a risk of the third traffic participant in accordance with at least one behavior of these first and second traffic participants, and a future behavior and a risk of the (n+1)th traffic participant in accordance with the behaviors of the first to n-th traffic participants (where n is an arbitrary integer between 2 and N-1) by performing simulation based on the recognition information and the pattern behavior associated for each driving subject of each moving body on the virtual space.

Next, a chain risk that can be predicted and avoided by the traffic safety support system 1 and the traffic safety support method as described above will be described on the basis of two specific cases.

Case 1

Figure 6:
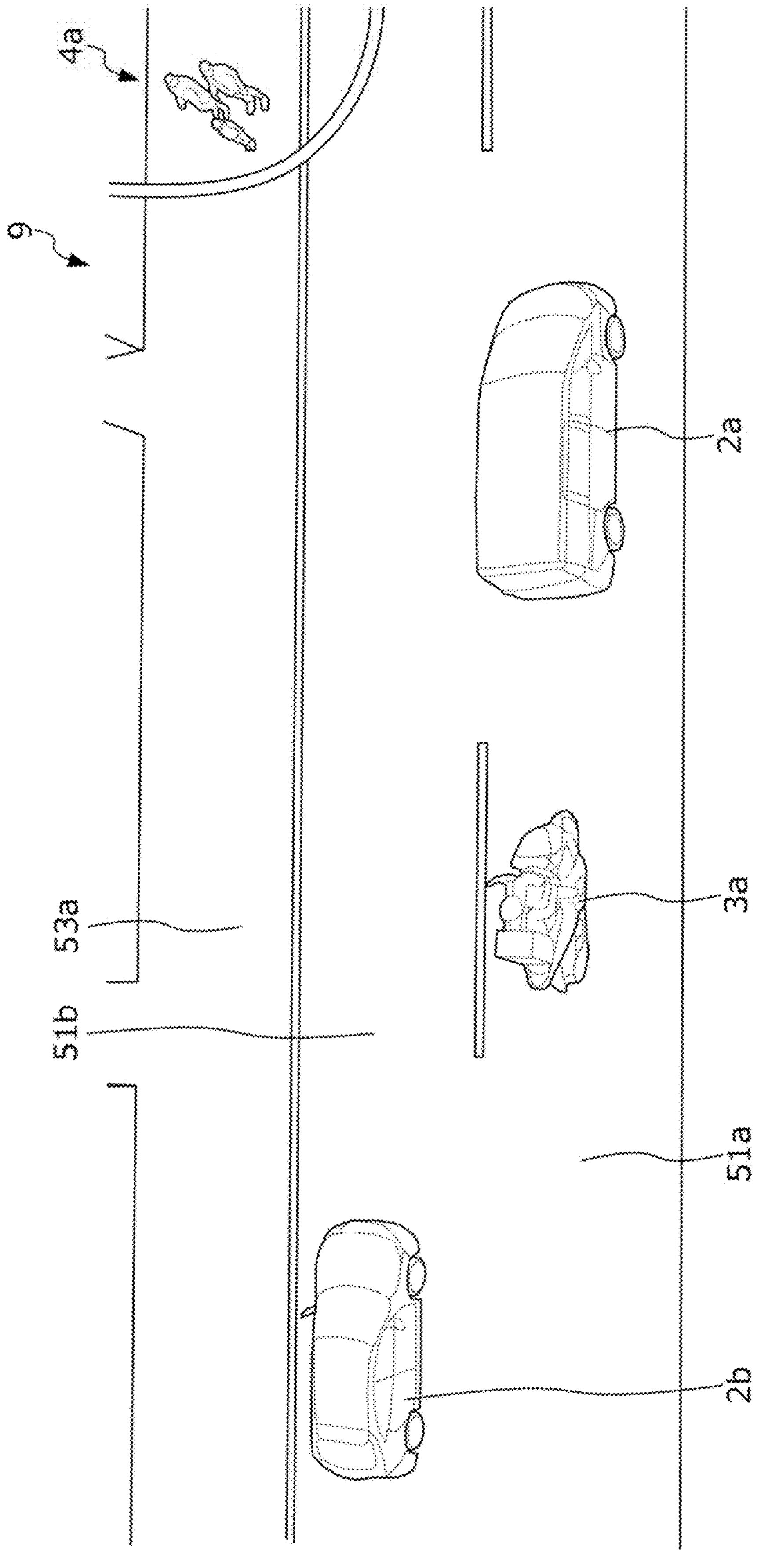
FIG. 6 is diagram illustrating a situation of a target traffic area before a prediction period by the predictor from a time when a chain risk of Case 1 can occur.

FIG. 6 is diagram illustrating a situation of the target traffic area 9 before a prediction period by the predictor 62 from a time when a chain risk of Case 1 can occur.

FIG. 6 illustrates a case where in a road with two lanes 51*a* and 51*b* in the target traffic area 9, a first four-wheeled vehicle 2*a* and a first motorcycle 3*a* are traveling on the lane 51*a* close to the center, and a second four-wheeled vehicle 2*b* is traveling on the lane 51*b* close to a pavement. FIG. 6 further illustrates a case where all of these moving bodies 2*a*, 2*b*, and 3*a* are traveling from left to right in FIG. 6 at almost the same speed. FIG. 6 further illustrates a case where the first four-wheeled vehicle 2*a* is traveling as a leading vehicle, and each of the first four-wheeled vehicle 2*a*, the first motorcycle 3*a*, and the second four-wheeled vehicle 2*b* is traveling while maintaining an appropriate distance to the other vehicles. FIG. 6 further illustrates a case where in a pavement 53*a* adjacent to the lane 51*b* in the target traffic area 9, a pedestrian group 4*a* are walking on a position on a front side in a traveling direction of the above-described moving bodies 2*a*, 2*b*, and 3*a* and sufficiently away from these moving bodies 2*a*, 2*b*, and 3*a* in a direction opposite to the traveling direction of these moving bodies 2*a*, 2*b*, and 3*a*. In Case 1, the target traffic area recognizer 60 of the coordination support device 6 recognizes the first four-wheeled vehicle 2*a*, the second four-wheeled vehicle 2*b*, the first motorcycle 3*a*, and the pedestrian group 4*a* as descried above as individual traffic participants, and acquires information regarding a position, speed, acceleration, a direction of movement, a vehicle type, and a vehicle rank of each traffic participant and information regarding a traffic environment around each traffic participant as the traffic participant recognition information and the traffic environment recognition information.

In Case 1, it is assumed that a rider that is a driving subject of the first motorcycle 3*a* is a delivery person being in the business of delivering articles according to the order to customers, and is driving the first motorcycle 3*a* to deliver the articles to the customer. Note that in Case 1, at the time point indicated in FIG. 6, the rider is in a hurry to meet the time specified by the customer. The psychological state of such a rider of the first motorcycle 3*a* is acquired as the driving subject state information and the driving subject characteristic information of this rider by the driving subject information acquirer 61 on the basis of, for example, schedule information of the rider transmitted from the portable information processing terminal possessed by this rider to the coordination support device 6, the detection information (for example, a pulse, a skin potential and the like of the rider) of the rider state sensor transmitted from the on-board communication device to the coordination support device 6, and the like.

In Case 1, it is assumed that the driver that is a driving subject of the second four-wheeled vehicle 2*b* is driving the second four-wheeled vehicle 2*b* to a travel destination together with its spouse sitting on the passenger seat. Note that in Case 1, at the time point indicated in FIG. 6, conversation regarding the travel destination heats up between this driver and its spouse, so that the driver cannot completely concentrate on the driving of the own vehicle and the recognition of the traffic participants around the own vehicle. The state of such a driver of the second four-wheeled vehicle 2*b* is acquired as the driving subject information and the driving subject characteristic information of this driver by the driving subject information acquirer 61 on the basis of, for example, schedule information of the driver transmitted from the portable information processing terminal possessed by this driver to the coordination support device 6, the detection information (for example, a direction of a line of sight, a pulse, and a skin potential of the driver, and whether or not there is conversation, and the like) of the driving subject state sensor transmitted from the on-board communication device to the coordination support device 6, and the like.

In Case 1, it is assumed that the pedestrian group 4*a* includes three pedestrians of a couple and its child, and these three persons are moving together in the same direction. Therefore, in Case 1, it is assumed that the target traffic area recognizer 60 recognizes, as one traffic participant, the pedestrian group 4*a* including these three persons. The wearable terminal worn as the portable information processing terminal by a father among three persons included in this pedestrian group 4*a* is connected to be wirelessly communicable with the coordination support device 6, and can receive the coordination support information transmitted from the coordination support device 6.

Figure 7:
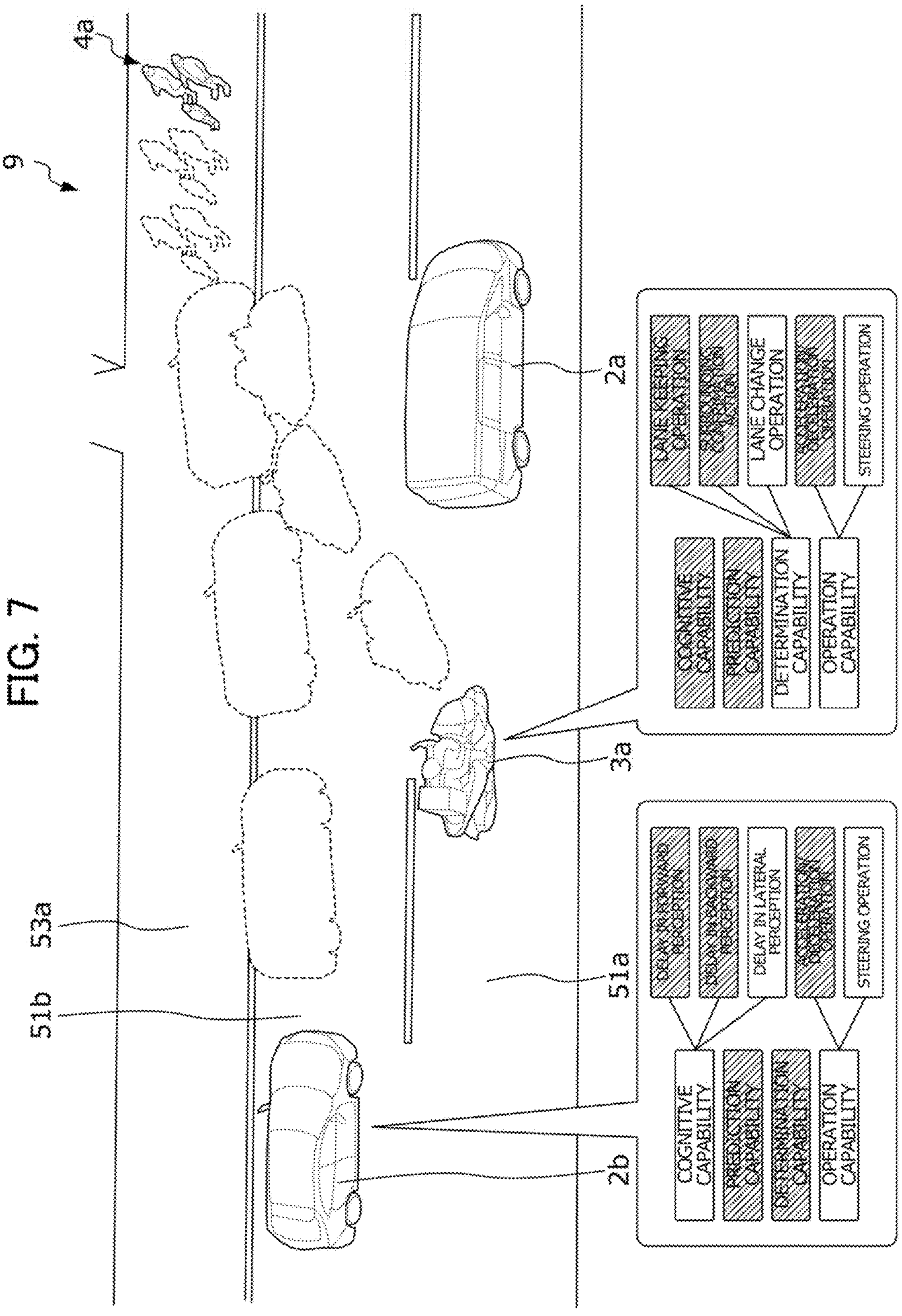
FIG. 7 is a diagram illustrating that there is a possibility that the chain risk of Case 1 is predicted to occur in the future that is a prediction period from the time point indicated in FIG. 6, by the predictor.

FIG. 7 is a diagram illustrating that there is a possibility that the chain risk of Case 1 is predicted to occur in the future that is a prediction period from the time point indicated in FIG. 6, by simulation performed in the predictor 62 at the time point indicated in FIG. 6. More specifically, FIG. 7 is a diagram schematically illustrating that the four participants of the moving bodies 2*a*, 2*b*, and 3*a* and the pedestrian group 4*a* are the prediction targets, and the future behavior and chain risk of each prediction target are predicted by the predictor 62 on the basis of the recognition information and the driving subject information acquired by the target traffic area recognizer 60 and the driving subject information acquirer 61 until the time point indicated in FIG. 6. Note that in FIG. 7, the behaviors of the traffic participants that are parties involved with the chain risk of Case 1 are indicated by broken lines.

FIG. 7 further illustrates a case where the high risk traffic participant identifier 621 of the predictor 62 identifies, as the high risk traffic participant, the first motorcycle 3*a* estimated that the rider is in a hurry on the basis of the recognition information and the driving subject information, the prediction target determiner 622 of the predictor 62 determines this first motorcycle 3*a* as the first traffic participant, determines the second four-wheeled vehicle 2*b* following this first traffic participant as the second traffic participant, and determines the pedestrian group 4*a* approaching the front side in the traveling direction of this second traffic participant as the third traffic participant, and further determines the first four-wheeled vehicle 2*a* that is a front traveling vehicle of the first traffic participant as the fourth traffic participant, and these first to fourth traffic participants are recognized as the prediction targets. In the following description, a case will be described where the driving subject information acquirer 61 can acquire the driving subject information of both of the rider of the first motorcycle 3*a* as the first traffic participant and the driver of the second four-wheeled vehicle 2*b* as the second traffic participant, but the present invention is not limited to this. Although the prediction accuracy is decreased as compared with the case where the driving subject information of both driver and rider can be acquired, significant prediction can be achieved by the predictor 62 if the driving subject information of at least one selected from the first and second traffic participants is acquired by the driving subject information acquirer 61.

As illustrated in FIG. 7, the driving capability estimator 624 of the predictor 62 estimates on the basis of the recognition information and the driving subject information that among the plurality of capability elements included in the driving capability of the rider of the first motorcycle 3*a* recognized as the first traffic participant, in particular, two capability elements of "determination capability" and "operation capability" decrease. The associator 625 of the predictor 62 determines two pattern behaviors of "lane change" and "steering operation" in view of the traffic environment of this rider as the pattern behavior associated with the driving subject of this first traffic participant in the case where it is estimated that the two capability elements of "determination capability" and "operation capability" of the rider decrease.

As illustrated in FIG. 7, the driving capability estimator 624 of the predictor 62 estimates that, on the basis of the recognition information and the driving subject information, among the plurality of capability elements included in the driving capability of the driver of the second four-wheeled vehicle 2*b* recognized as the second traffic participant, in particular, two capability elements of "cognitive capability" and "operation capability" decrease. The associator 625 of the predictor 62 determines two pattern behaviors of "delay in lateral perception" and "steering operation" in view of the traffic environment of this driver as the pattern behavior associated with the driving subject of this second traffic participant in the case where it is estimated that the two capability elements of "cognitive capability" and "operation capability" of this driver decrease.

The simulator 626 predicts a future behavior and a risk of the first traffic participant, a future behavior and a risk of the second traffic participant in accordance with the behavior of this first traffic participant, and a future behavior and a risk of the third traffic participant in accordance with at least one behavior of these first and second traffic participants by performing simulation on the virtual space on the basis of the recognition information, the driving subject information, and the pattern behaviors associated with the driving subjects of the first and second traffic participants.

The driving subject of the first motorcycle 3*a* that is the first traffic participant is associated with two pattern behaviors of "lane change" and "steering operation". Therefore, the simulator 626 can predict the track in which the first four-wheeled vehicle 2*a* recognized as the fourth traffic participant is overtaken while performing the lane change as illustrated in FIG. 7 as the future behavior of this first traffic participant.

The driving subject of the second four-wheeled vehicle 2*b* that is the second traffic participant is associated with two pattern behaviors of "delay in lateral perception" and "steering operation". Therefore, the simulator 626 can predict the track in which the second traffic participant moves toward the pavement by steering in surprise and fluster when the presence of the first traffic participant is recognized with a delay as illustrated in FIG. 7 as the future behavior of the second traffic participant in accordance with the future behavior of the first traffic participant as described above.

The simulator 626 can predict the track in which the third traffic participant moves on the pavement without sufficiently recognizing the presence of the first and second traffic participants as illustrated in FIG. 7 as the future behavior of the third traffic participant in accordance with at least one behavior of the first and second traffic participants as described above. As a result, the simulator 626 can predict that there is a possibility that a risk in which the second traffic participant comes into contact with the third traffic participant occurs after the prediction period.

As described above, the predictor 62 can predict, at the time point indicated in FIG. 6, that is, at the time point when the third traffic participant is sufficiently away from the first to second and fourth traffic participants, the occurrence of a chain risk in which the second traffic participant surprised at the lane change of the first traffic participant comes into contact with the third traffic participant after the prediction period from this point. The coordination support information notifier 63 notifies the first to third traffic participants that are parties involved with this chain risk of the coordination support information for encouraging communication among the traffic participants and recognition of a surrounding traffic environment in a case where the chain risk as illustrated in FIG. 7 is predicted to occur by the predictor 62.

Here, the coordination support information notifier 63 notifies, at the time point indicated in FIG. 6, the rider of the first motorcycle 3*a* that is the first traffic participant of the coordination support information for encouraging the recognition of the traffic participants around the own vehicle including the second four-wheeled vehicle 2*b* behind the own vehicle, notifies the driver of the second four-wheeled vehicle 2*b* that is the second traffic participant of the coordination support information for encouraging recognition of the traffic participants around the own vehicle including the first motorcycle 3*a* and the pedestrian group 4*a* ahead and maintenance of appropriate distance to the surrounding traffic participants, and notifies the pedestrian group 4*a* that is the third traffic participant of the coordination support information for encouraging recognition of the moving bodies 2*a*, 2*b*, and 3*a* on the front side in the traveling direction.

By this means, the driver of the second four-wheeled vehicle 2*b* recognizes the first motorcycle 3*a* and the pedestrian group 4*a*, so that it is possible to slightly decrease the speed and increase the distance to the first motorcycle 3*a*. The rider of the first motorcycle 3*a* recognizes the second four-wheeled vehicle 2*b*, so that after the rider confirms that the distance between the own vehicle and the second four-wheeled vehicle 2*b* can be sufficiently maintained, it is possible to perform the lane change safely and smoothly. The father included in the pedestrian group 4*a* recognizes the moving bodies 2*a*, 2*b*, and 3*a* ahead, so that it is possible to move the child to a position away from the road. According to the traffic safety support system 1 and the traffic safety support method according to the present embodiment, the above-described chain risk of Case 1 can be predicted to occur to avoid occurrence of the chain risk.

Case 2

Figure 8:
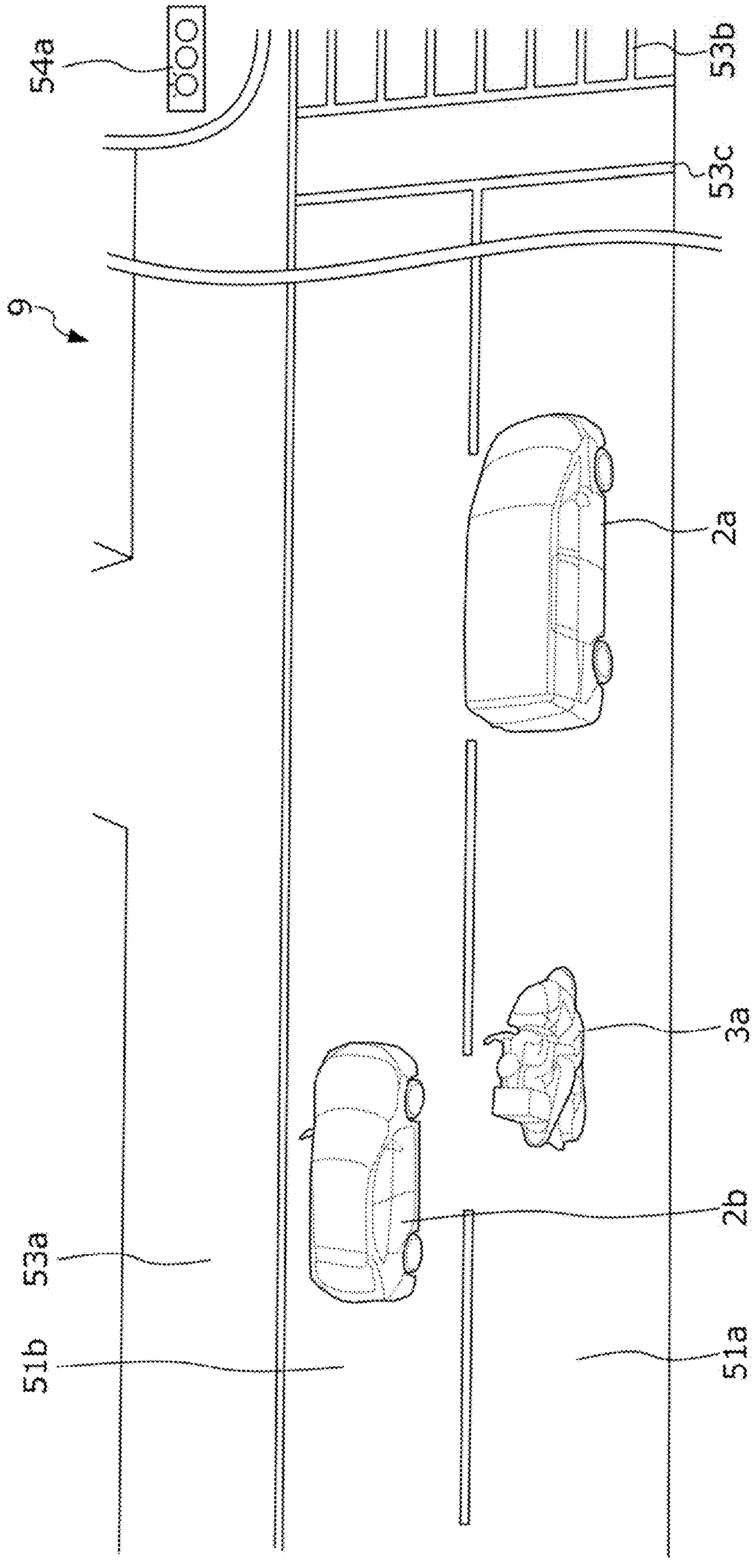
FIG. 8 is diagram illustrating a situation of a target traffic area before a prediction period by the predictor from a time when a chain risk of Case 2 can occur.

FIG. 8 is diagram illustrating a situation of the target traffic area 9 before a prediction period by the predictor 62 from a time when a chain risk of Case 2 can occur.

FIG. 8 illustrates a case where in a road with two lanes 51*a* and 51*b* in the target traffic area 9, a first four-wheeled vehicle 2*a* and a first motorcycle 3*a* are traveling on the lane 51*a* close to the center, and a second four-wheeled vehicle 2*b* is traveling on the lane 51*b* close to a pavement. FIG. 8 further illustrates a case where all of these moving bodies 2*a*, 2*b*, and 3*a* are traveling from left to right in FIG. 8 at almost the same speed. FIG. 8 further illustrates a case where the first four-wheeled vehicle 2*a* is traveling as a leading vehicle, and each of the first motorcycle 3*a* and the second four-wheeled vehicle 2*b* are traveling in parallel behind the first four-wheeled vehicle 2*a*. FIG. 8 further illustrates a case where a crosswalk 53*b* exists at a position sufficiently away ahead from the moving bodies 2*a*, 2*b*, and 3*a*. FIG. 8 further illustrates a case where the first four-wheeled vehicle 2*a* that is a front traveling vehicle of the first motorcycle 3*a* has a vehicle rank slightly higher than general four-wheeled vehicles. Therefore, it is assumed that it is more difficult for the rider of the first motorcycle 3*a* to recognize the front side as compared with the case where the general four-wheeled vehicle is traveling ahead. At the time point indicated in FIG. 8, it is assumed that a lighting color of traffic lights 54*a* with respect to the lanes 51*a* and 51*b* on which these moving bodies 2*a*, 2*b*, and 3*a* are traveling is blue that means "the moving bodies may go ahead or turn left or right". In Case 2, it is assumed that the lighting color of the traffic lights 54*a* will sequentially change to yellow and red that means "stop" during the prediction period from the time point indicated in FIG. 8.

In Case 2, the target traffic area recognizer 60 of the coordination support device 6 recognizes the first four-wheeled vehicle 2*a*, the second four-wheeled vehicle 2*b*, and the first motorcycle 3*a* as descried above as individual traffic participants, and acquires information regarding a position, speed, acceleration, a direction of movement, a vehicle type, and a vehicle rank of each traffic participant, information regarding a position of the crosswalk 53*b*, and information regarding a traffic environment around each traffic participant such as traffic light state information of the traffic lights 54*a* with respect to the lanes 51*a* and 51*b* as the traffic participant recognition information and the traffic environment recognition information.

In Case 2, the driver that is a driving subject of the first four-wheeled vehicle 2*a* cannot completely concentrate on the driving of the own vehicle and the recognition of the traffic participants around the own vehicle and the traffic environment for the same reason as the driver of the second four-wheeled vehicle 2*b* in Case 1 described above, for example. The state of such a driver of the first four-wheeled vehicle 2*a* is acquired as the driving subject information and the driving subject characteristic information of this driver by the driving subject information acquirer 61 on the basis of, for example, schedule information of the driver transmitted from the portable information processing terminal possessed by this driver to the coordination support device 6, the detection information (for example, a direction of a line of sight, a pulse, and a skin potential of the driver, and whether or not there is conversation, and the like) of the driving subject state sensor transmitted from the on-board communication device to the coordination support device 6, and the like.

Figure 9:
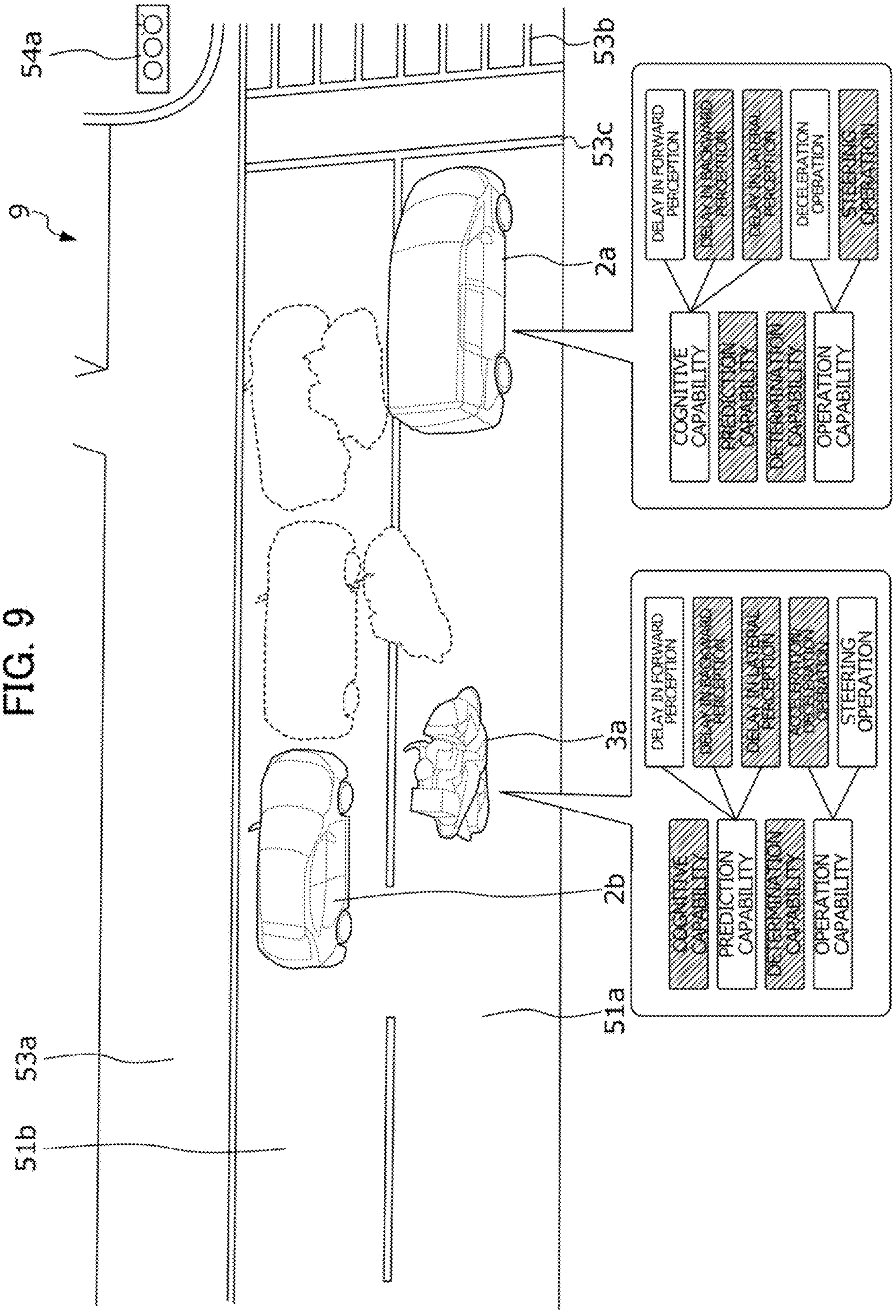
FIG. 9 is a diagram illustrating that there is a possibility that the chain risk of Case 2 is predicted to occur in the future that is a prediction period from the time point indicated in FIG. 8, by the predictor.

FIG. 9 is a diagram illustrating that there is a possibility that the chain risk of Case 2 is predicted to occur in the future that is a prediction period from the time point indicated in FIG. 8, by simulation performed in the predictor 62 at the time point indicated in FIG. 8. More specifically, FIG. 9 is a diagram illustrating that the three participants of the moving bodies 2*a*, 2*b*, and 3*a* are the prediction targets, and the future behavior and chain risk of each prediction target are predicted by the predictor 62 on the basis of the recognition information and the driving subject information acquired by the target traffic area recognizer 60 and the driving subject information acquirer 61 until the time point indicated in FIG. 8. Note that in FIG. 9, among the traffic participants that are parties involved with the chain risk of Case 2, the behaviors of, in particular, the first motorcycle 3*a* and the second four-wheeled vehicle 2*b* are indicated by broken lines.

FIG. 9 further illustrates a case where the high risk traffic participant identifier 621 of the predictor 62 identifies, as the high risk traffic participant, the first four-wheeled vehicle 2*a* estimated that the traffic participants around the own vehicle and the traffic environment cannot be recognized sufficiently on the basis of the recognition information and the driving subject information, the prediction target determiner 622 of the predictor 62 determines this first four-wheeled vehicle 2*a* as the first traffic participant, determines the first motorcycle 3*a* following this first traffic participant as the second traffic participant, and determines the second four-wheeled vehicle 2*b* traveling in parallel to this second traffic participant as the third traffic participant, and these first to third traffic participants are recognized as the prediction targets. In the following description, a case will be described where the driving subject information acquirer 61 the driving subject information acquirer 61 can acquire the driving subject information of the driver of the first four-wheeled vehicle 2*a* as the first traffic participant, but the present invention is not limited to this. Significant prediction can be achieved by the predictor 62 if the driving subject information of at least one selected from the first and second traffic participants can be acquired by the driving subject information acquirer 61.

As illustrated in FIG. 9, the driving capability estimator 624 of the predictor 62 estimates, based on the recognition information and the driving subject information, that among the plurality of capability elements included in the driving capability of the driver of the first four-wheeled vehicle 2*a* recognized as the first traffic participant, in particular, two capability elements of "cognitive capability" and "operation capability" decrease. The associator 625 of the predictor 62 determines two pattern behaviors of "delay in forward perception" and "deceleration operation" in view of the traffic environment (in particular, timing of changing the lighting color of the traffic lights 54*a*) of this driver as the pattern behavior associated with the driving subject of this first traffic participant in the case where it is estimated that the two capability elements of "cognitive capability" and "operation capability" of this driver decrease.

As illustrated in FIG. 9, the driving capability estimator 624 of the predictor 62 grasps that the first four-wheeled vehicle 2*a* with relatively high vehicle rank is traveling ahead of the rider of the first motorcycle 3*a* recognized as the second traffic participant on the basis of the recognition information, and thereby, estimates that among the plurality of capability elements included in the driving capability of this rider, in particular, two capability elements of "prediction capability" and "operation capability" decrease. The associator 625 of the predictor 62 determines two pattern behaviors of "delay in forward perception" and "steering operation" in view of the traffic environment (in particular, a distance between the own vehicle and the front traveling vehicle, and a vehicle rank of the front traveling vehicle) of this rider as the pattern behavior associated with the driving subject of this second traffic participant in the case where it is estimated that the two capability elements of "prediction capability" and "operation capability" of this rider decrease.

The simulator 626 predicts a future behavior and a risk of the first traffic participant, a future behavior and a risk of the second traffic participant in accordance with the behavior of this first traffic participant, and a future behavior and a risk of the third traffic participant in accordance with at least one behavior of these first and second traffic participants by performing simulation on the virtual space on the basis of the recognition information, the driving subject information, and the pattern behavior associated with the driving subject of the first traffic participant.

The driving subject of the first four-wheeled vehicle 2*a* that is the first traffic participant is associated with two pattern behaviors of "delay in forward perception" and "deceleration operation". Therefore, the simulator 626 recognizes that the lighting color of the traffic lights 54*a* has changed from blue to red slightly before a stop line 53*c* as illustrated in FIG. 9 as the future behavior of this first traffic participant, so that it is possible to predict the track in which the first traffic participant suddenly decelerates in fluster and stops before the stop line 53*c*.

The driving subject of the first motorcycle 3*a* that is the second traffic participant is associated with two pattern behaviors of "delay in forward perception" and "steering operation". Therefore, the simulator 626 can predict the track in which the second traffic participant travels at the same speed as the first traffic participant slightly before the stop line 53*c* without being able to recognizing that the lighting color of the traffic lights 54*a* has changed from blue to red in the same manner, and steers in fluster due to sudden stop of the first traffic participant as the first traffic participant, and escapes to the road 51*b* close to the pavement 53*a* side as illustrated in FIG. 9 as the future behavior of the second traffic participant in accordance with the future behavior of the first traffic participant as described above.

The simulator 626 can predict the track in which the third traffic participant decelerates with spare time the own vehicle by recognizing that the lighting color of the traffic lights 54*a* has changed blue to red from a position sufficiently away from the stop line 53*c* as illustrated in FIG. 9 as the future behavior of the third traffic participant in accordance with at least one behavior of the first and second traffic participants as described above. As a result, the simulator 626 can predict that there is a possibility that a risk in which the second traffic participant comes into contact with the third traffic participant occurs after the prediction period.

As described above, the predictor 62 can predict, at the time point indicated in FIG. 8, that is, at the time point when the first to third traffic participants are sufficiently away from the crosswalk 53*b*, the occurrence of a chain risk in which the second traffic participant surprised at the sudden stop of the first traffic participant comes into contact with the third traffic participant after the prediction period from the time point. The coordination support information notifier 63 notifies the first to third traffic participants that are parties involved with this chain risk of the coordination support information for encouraging communication among the traffic participants and recognition of a surrounding traffic environment in a case where the chain risk as illustrated in FIG. 8 is predicted to occur by the predictor 62.

Here, the coordination support information notifier 63 notifies, at the time point indicated in FIG. 8, the driver of the first four-wheeled vehicle 2*a* that is the first traffic participant of the coordination support information for encouraging the recognition of the traffic environment around the own vehicle including the forward traffic lights 54*a* and the first motorcycle 3*a* behind the own vehicle, notifies the rider of the first motorcycle 3*a* that is the second traffic participant of the coordination support information for encouraging recognition of the traffic participants around the own vehicle including the first four-wheeled vehicle 2*a* ahead and the second four-wheeled vehicle 2*b* on the lateral side, and maintenance of appropriate distance to the surrounding traffic participants, and notifies the second four-wheeled vehicle 2*b* that is the third traffic participant of the coordination support information for encouraging recognition of the first motorcycle 3*a* on the lateral side.

By this means, the driver of the first four-wheeled vehicle 2*a* recognizes the crosswalk 53*b* and the traffic lights 54*a* ahead and the first motorcycle 3*a* behind, so that it is possible to start to decelerate the own vehicle from a position sufficiently away from the stop line 53*c*, not to decelerate suddenly, and stop the own vehicle safety and smoothly before the stop line 53*c*. The rider of the first motorcycle 3*a* gradually decelerates the own vehicle from a position sufficiently away from the stop line 53*c* so as to sufficiently maintain the distance between the first four-wheeled vehicle 2*a* ahead and the own vehicle while recognizing the existence of the second four-wheeled vehicle 2*b* on the lateral side. The rider of the first motorcycle 3*a* can recognize the existence of the traffic lights 54*a* across the first four-wheeled vehicle 2*a* by sufficiently maintaining the distance between the first four-wheeled vehicle 2*a* ahead and the own vehicle, so that it is possible to start deceleration from the position sufficiently away from the stop line 53*c* and stop the own vehicle safely and smoothly before the first four-wheeled vehicle 2*a*. The driver of the second four-wheeled vehicle 2*b* recognizes the first motorcycle 3*a* on the lateral side, so that it is possible to stop the own vehicle safely and smoothly before the stop line 53*c* while maintaining the distance between the first motorcycle 3*a* and the own vehicle to prepare for possible sudden lane change of the first motorcycle 3*a*, for example. According to the traffic safety support system 1 and the traffic safety support method according to the present embodiment, the above-described chain risk of Case 2 can be predicted to occur to avoid occurrence of the chain risk.

According to the traffic safety support system 1 and the traffic safety support method according to the present embodiment, the following effects can be achieved.

(1) In the traffic safety support system 1, the predictor 62 predicts the futures of the plurality of traffic participants recognized by the target traffic area recognizer 60 on the basis of the recognition information regarding each traffic participant acquired by the target traffic area recognizer 60 and the driving subject state information correlated with driving capability of driving subjects of the moving bodies recognized as the traffic participants by the target traffic area recognizer 60. Accordingly, the predictor 62 can predict the futures of the plurality of traffic participants including an irregular action of a specific moving body in view of decrease of the driving capability at that time of the driving subject of the specific moving body. The coordination support information notifier 63 notifies at least one selected from a plurality of prediction targets by the predictor 62 of the coordination support information on the basis of the prediction results for these prediction targets, thereby making it possible to avoid a risk predicted for these prediction targets, so that it is possible to improve safety, convenience and smoothness of traffic.

In a case where among first, second and third traffic participants that are the prediction targets, the first and second traffic participants are first and second moving bodies in the target traffic area 9 and driving subject state information of at least one selected from driving subjects of each of these first and second moving bodies is acquired, the predictor 62 predicts a future behavior of the first traffic participant, a future behavior of the second traffic participant in accordance with the future behavior of this first traffic participant, and a risk in the future of the third traffic participant in accordance with the future behavior of at least one selected from these first and second traffic participants on the basis of the recognition information and the driving subject state information. The coordination support information notifier 63 notifies at least one selected from these first to third traffic participants of the coordination support information on the basis of the prediction results for the future behaviors of these first and second traffic participants and the prediction result for the risk in the future of the third traffic participant. This makes it possible to avoid a chain risk with which parties that are three or more participants including the first, second and third traffic participants are involved and that may occur in a chained manner among these plurality of traffic participants due to decrease of the driving capability of the driving subject of at least one selected from the first and second traffic participants and then occur in the third traffic participant. Thus, according to the present invention, it is possible to improve safety, convenience and smoothness of traffic.

(2) In a case where the third traffic participant is assumed as a subject, it is often difficult to predict a chain risk that can occur in a chained manner between the first and second traffic participants other than the third traffic participant itself and finally occur in the third traffic participant itself. Therefore, in many cases, the third traffic participant has little spare time to perform an action for avoiding such a risk that occurs in a chained manner. In contrast, in the traffic safety support system 1, in a case where occurrence of a chain risk in the future of the third traffic participant is predicted by the predictor 62, the coordination support information notifier 63 notifies a communication interface such as a portable information processing terminal possessed by the third traffic participant and an on-board communication device of the coordination support information. This can secure a period for the third traffic participant to perform an action for avoiding a risk that occurs in a chained manner, so that it is possible to improve safety of the third traffic participant.

(3) In the traffic safety support system 1, in a case where the driving subject is a person, the driving subject information acquirer 61 acquires the driving subject state information on the basis of time-series data of at least one selected from biological information, appearance information, and speech information of the driving subject engaged in driving. The predictor 62 can predict a future behavior of a moving body driven by a driving subject by appropriately grasping the driving capability of the driving subject engaged in driving using such driving subject state information, so that it is possible to predict various chain risks that can occur in the prediction targets. Thus, according to the traffic safety support system 1, it is possible to improve safety, convenience and smoothness of traffic.

(4) In the traffic safety support system 1, in a case where the driving subject is a person, the driving subject information acquirer 61 acquires driving subject characteristic information regarding characteristics of a driving subject on the basis of at least one selected from past driving history of the driving subject and time-series state information of the driving subject. The predictor 62 can predict a future behavior of a moving body driven by a driving subject by appropriately grasping the characteristics in addition to the driving capability of the driving subject engaged in driving using the driving subject characteristic information of the driving subject in addition to the recognition information and the driving subject state information, so that it is possible to predict various chain risks that can occur in the prediction targets. Thus, according to the traffic safety support system 1, it is possible to improve safety, convenience and smoothness of traffic.

(5) In the traffic safety support system 1, the target traffic area recognizer 60 acquires the traffic participant recognition information regarding each traffic participant in the target traffic area 9 and the traffic environment information regarding a traffic environment of each traffic participant in this target traffic area 9. The predictor 62 can predict futures of the prediction targets by appropriately grasping the traffic environment around each traffic participant using such traffic participant recognition information and traffic environment recognition information, so that it is possible to predict various chain risks that can occur in the prediction targets. Thus, according to the traffic safety support system 1, it is possible to improve safety, convenience and smoothness of traffic.

(6) In the traffic safety support system 1, the predictor 62 predicts futures of the prediction targets by constructing a virtual space that simulates the target traffic area 9 using a computer and performing simulation based on the recognition information and the driving subject state information on the virtual space. By this means, the predictor 62 can predict various chain risks that can occur in the prediction targets by reproducing each traffic participant in the target traffic area 9 and the traffic environment around each traffic participant and monitoring an event that can occur in the target traffic area 9 from a higher perspective. Thus, according to the traffic safety support system 1, it is possible to improve safety, convenience and smoothness of traffic.

(7) In the traffic safety support system 1, the behavior estimator 623 associates the behavior estimation input including at least the recognition information between the recognition information and the driving subject state information with at least one selected from a plurality of pattern behaviors of the driving subject determined in advance, and the simulator 626 predicts futures of the prediction targets by performing simulation based on the pattern behavior associated by the behavior estimator 623 on the virtual space. In the traffic safety support system 1, the predictor 62 can predict futures of the prediction targets promptly by behaviors that can be performed by the driving subject of the moving body in the future being determined in advance as the pattern behaviors, so that it is possible to promptly make notifications of coordination support information based on the prediction result by the predictor 62, which results in securing a period for each traffic participant to perform an action for avoiding a chain risk that can occur in the future. Thus, according to the traffic safety support system 1, it is possible to improve safety, convenience and smoothness of traffic.

(8) In the traffic safety support system 1, the behavior estimator 623 includes a driving capability estimator 624 configured to estimate decrease of the driving capability of the driving subject for each capability element on the basis of the behavior estimation input including at least the recognition information, and an associator 625 configured to associate the capability element estimated to decrease by the driving capability estimator 624 with at least one selected from a plurality of the pattern behaviors determined in advance. This allows the associator 625 to promptly determine the pattern behavior from the behavior estimation input, so that it is possible to further secure a period for each traffic participant to perform an action for avoiding a chain risk that can occur in the future as described above. Thus, according to the traffic safety support system 1, it is possible to improve safety, convenience and smoothness of traffic.

(9) In the traffic safety support system 1, the driving capability estimator 624 divides driving capability that the driving subject should have to appropriately drive the moving body into at least four capability elements of cognitive capability, prediction capability, determination capability and operation capability, and estimates decrease of the driving capability of the driving subject for each of the four capability elements. This allows the behavior estimator 623 to promptly determine an appropriate pattern behavior in accordance with decrease of each capability element, so that it is possible to further secure a period for each traffic participant to perform an action for avoiding a risk that can occur in the future as described above. Thus, according to the traffic safety support system 1, it is possible to improve safety, convenience and smoothness of traffic.

(10) Although three or more traffic participants exist actually in the target traffic area 9, when a chain risk that can occur in a chained manner, as described above, in prediction targets that are all of these traffic participants is evaluated, load required for the predictor 62 may increase. In contrast, in the traffic safety support system 1 according to the present embodiment, the high risk traffic participant identifier 621 identifies, as a high risk traffic participant, a traffic participant estimated to be highly likely to perform an action that induces a predetermined chain risk in the future among a plurality of traffic participants recognized by the target traffic area recognizer 60, and a prediction target determiner 622 determines, with this high risk traffic participant specified as the first traffic participant, two participants extracted from among a plurality of traffic participants existing around this first traffic participant as the second and third traffic participants. The predictor 62 can reduce load in the predictor 62 by narrowing down the prediction targets to the high risk traffic participant and the traffic participants around the high risk traffic participant, so that it is possible to promptly predict the futures of the prediction targets, which results in securing a period for each traffic participant to perform an action for avoiding a chain risk that can occur in the future. Thus, according to the present invention, it is possible to improve safety, convenience and smoothness of traffic.

While one embodiment of the present invention has been described above, the present invention is not limited to this. Detailed configurations may be changed as appropriate within a scope of gist of the present invention. For example, while a case has been described where in all of the four-wheeled vehicles 2 moving in the target traffic area 9, drivers that are persons are set as driving subjects in the above described embodiments, the present invention is not limited to this. The present invention can be applicable even in the case where all or some of a plurality of four-wheeled vehicles 2 moving in the target traffic area are automated driving vehicles each in which a non-human computer is set as a driving subject. By this means, in a case where the driving subject is a computer, the driving subject information acquirer 61 can acquire a control signal according to automated driving control from the on-board communication device 24 of the on-board devices 20, for example, thereby acquiring the driving subject state information and the driving subject characteristic information correlated with the driving capability of the driving subject of the automated driving vehicle.

EXPLANATION OF REFERENCE NUMERALS

1: Traffic safety support system
9: Target traffic area
2: Four-wheeled vehicle (mobile body, traffic participant)
20: On-board devices
21: On-board driving support device (recognition means)
22: Driver HMI (notification means)
23: Driving subject state sensor (driving subject information acquisition means)
24: On-board communication device (recognition means, driving subject information acquisition means, notification means)
25: Portable information processing terminal (recognition means, driving subject information acquisition means, notification means)
3: motorcycle (mobile body, traffic participant)
30: On-board devices
31: On-board driving support device (recognition means)
32: Rider HMI (notifier)
33: Rider state sensor (driving subject information acquirer)
34: On-board communication device (recognition means, driving subject information acquisition means, notification means)
35: Portable information processing terminal (recognition means, driving subject information acquisition means, notification means)
4: Pedestrian (person, traffic participant)
40: Portable information processing terminal (recognition means, notification means)
51: Road (traffic environment)
52: Intersection (traffic environment)
53: Pavement (traffic environment)
54: Traffic light (traffic environment)
55: Traffic light control device (recognition means)
56: Infrastructure camera (recognition means)
6: Coordination support device
60: Target traffic area recognizer (recognition means)
61: Driving subject information acquirer (driving subject information acquisition means)
62: Predictor (predictor)
621: High risk traffic participant identifier (high risk traffic participant identification means)
622: Prediction target determiner (prediction target determination means)
623: Behavior estimator (behavior estimation means)
624: Driving capability estimator (driving capability estimation means)
625: Associator (association means)
626: Simulator
63: Coordination support information notifier (notification means)
64: Traffic environment database (recognition means)
65: Driving history database (driving subject information acquisition means)

The invention claimed is:

1. A traffic safety support system, comprising:
one or more computers configured to:
recognize traffic participants as persons or moving bodies in a target traffic area and acquire recognition information regarding each traffic participant;
acquire state information correlated with driving capability of driving subjects of the moving bodies recognized as the traffic participants;
determine a plurality of prediction targets from among a plurality of recognized traffic participants, and predict futures of the prediction targets on a basis of the recognition information and the state information; and notify at least one selected from the prediction targets of support information on the basis of a prediction result for the futures, wherein the computers are further configured to, in a case where first, second and third traffic participants that are the prediction targets, respectively, are first, second, and third moving bodies in the target traffic area, and state information of at least one selected from the first and second moving body is acquired, predict a future behavior of the first moving body, a future behavior of the second moving body in accordance with the future behavior of the first moving body, and a risk in the future of the third moving body in accordance with the future behavior of at least one selected from the first and second moving bodies, by performing simulation on a virtual space that simulates the target traffic area on the basis of the recognition information and the state information, and notify a driver of the first moving body or the third moving body of the support information by transmitting the support information to a communication interface of the first moving body or the third moving body at a point in time when an occurrence of a risk in the future of the third moving body is predicted.

2. A traffic safety support system, comprising:

one or more computers configured to:

recognize traffic participants as persons or moving bodies in a target traffic area and acquire recognition information regarding each traffic participant;

acquire state information correlated with driving capability of driving subjects of the moving bodies recognized as the traffic participants;

determine a plurality of prediction targets from among a plurality of recognized traffic participants, and predict futures of the prediction targets on a basis of the recognition information and the state information; and notify at least one selected from the prediction targets of support information on the basis of a prediction result for the futures, wherein the computers are further configured to, in a case where first, second and third traffic participants that are the prediction targets, respectively, are first and second moving bodies and a pedestrian in the target traffic area, and state information of at least one selected from the first and second moving body is acquired, predict a future behavior of the first moving body, a future behavior of the second moving body in accordance with the future behavior of the first moving body, and a risk in the future of the pedestrian in accordance with the future behavior of at least one selected from the first and second moving bodies, by performing simulation on a virtual space that simulates the target traffic area on the basis of the recognition information and the state information, and notify a driver of the first moving body or the pedestrian of the support information by transmitting the support information to a communication interface of the first moving body or the pedestrian at a point in time when an occurrence of a risk in the future of the pedestrian is predicted.

3. The traffic safety support system according to claim 1, wherein the computers are further configured to, in a case where the driving subject is a person, acquire the state information on the basis of time-series data of at least one selected from biological information, appearance information, and speech information of the driving subject engaged in driving.

4. The traffic safety support system according to claim 3, wherein the computers are further configured to, in a case where the driving subject is a person, acquire characteristic information regarding characteristics of the driving subject on the basis of at least one selected from past driving history and the state information of the driving subject, and predict futures of the prediction targets on the basis of the recognition information, the state information and the characteristic information.

5. The traffic safety support system according to claim 1, wherein the computers are further configured to acquire the recognition information regarding recognition targets including each traffic participant in the target traffic area and a traffic environment of each traffic participant in the target traffic area.

6. The traffic safety support system according to claim 1, wherein the computers are further configured to:

associate a first input including at least the recognition information between the recognition information and the state information with at least one selected from a plurality of pattern behaviors of the driving subject determined in advance; and predict futures of the prediction targets by performing simulation based on the pattern behavior on the virtual space.

7. The traffic safety support system according to claim 6, wherein the computers are further configured to:

estimate decrease of the driving capability for each capability element on the basis of the first input; and associate the capability element estimated to decrease-with at least one selected from a plurality of the pattern behaviors.

8. The traffic safety support system according to claim 7, wherein the driving capability is divided into at least four capability elements of cognitive capability, prediction capability, determination capability and operation capability by the driving subject.

9. The traffic safety support system according to claim 1, wherein the computers are further configured to:

identify, as a high risk traffic participant, a traffic participant estimated to be highly likely to perform an action that induces a predetermined chain risk in the future among a plurality of traffic participants on the basis of a second input including at least the recognition information between the recognition information and the state information; and determine the high risk traffic participant as the first traffic participant, and determine, as the second and third traffic participants, two participants extracted from among a plurality of traffic participants existing around the first traffic participant.

10. A traffic safety support method of supporting safety of traffic participants using one or more computers, the traffic safety support method comprising:

a step of recognizing traffic participants as persons or moving bodies in a target traffic area and acquiring recognition information regarding each traffic participant;

a step of acquiring state information correlated with driving capability of driving subjects of the moving bodies recognized as the traffic participants;

a step of predicting futures of a plurality of prediction targets determined among a plurality of recognized traffic participants on a basis of the recognition information and the state information; and a step of notifying at least one selected from a plurality of the prediction targets of support information on the basis of prediction results for the prediction targets, wherein in the step of predicting the futures of the prediction targets, in a case where first, second and third traffic participants that are the prediction targets, respectively, are first, second, and third moving bodies in the target traffic area, and state information of at least one selected from the first and second moving body is acquired, a future behavior of the first moving body, a future behavior of the second moving body in accordance with the future behavior of the first moving body, and a risk in the future of the third moving body in accordance with the future behavior of at least one selected from the first and second moving bodies are predicted by performing simulation on a virtual space that simulates the target traffic area on the basis of the recognition information and the state information, and wherein in the step of notifying the support information, the support information is notified to a driver of the first moving body or the third moving body by transmitting the support information to a communication interface of the first moving body or the third moving body at a point when an occurrence of the risk in the future of the third moving body is predicted.

* * * * *